(12) United States Patent
Del Barrio et al.

(10) Patent No.: US 11,248,162 B2
(45) Date of Patent: Feb. 15, 2022

(54) VISCOSIFICATION OF AQUEOUS SOLUTIONS

(71) Applicant: Schlumberger Technology Corporation, Sugar Land, TX (US)

(72) Inventors: Jesús Del Barrio, Saragossa (ES); Robert Seth Hartshorne, Burwell (GB); Trevor Lloyd Hughes, Cambridge (GB); Andrew Meredith, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/824,224

(22) Filed: Mar. 19, 2020

(65) Prior Publication Data

US 2020/0299569 A1    Sep. 24, 2020

(30) Foreign Application Priority Data

Mar. 20, 2019 (GB) ...................................... 1903800

(51) Int. Cl.
*C09K 8/68*    (2006.01)
*C09K 8/80*    (2006.01)
(Continued)

(52) U.S. Cl.
CPC ................ *C09K 8/685* (2013.01); *C09K 8/74* (2013.01); *C09K 8/80* (2013.01); *C09K 8/88* (2013.01)

(58) Field of Classification Search
None
See application file for complete search history.

(56) References Cited

U.S. PATENT DOCUMENTS

| 4,529,523 A | 7/1985 | Landoll |
| 7,405,183 B2 | 7/2008 | Hanes, Jr. |

(Continued)

FOREIGN PATENT DOCUMENTS

| WO | 2015002669 A1 | 1/2015 |
| WO | 2018024793 A1 | 2/2018 |
| WO | 2018024795 A1 | 2/2018 |

OTHER PUBLICATIONS

Brooks et al., Synthesis and Applications of Boronic Acid-Containing Polymers: From Materials to Medicine, Chemical Reviews, American Chemical Society, 2015, pp. 1375-1397.

(Continued)

*Primary Examiner* — Andrew Sue-Ako

(57) ABSTRACT

A viscosified aqueous solution, optionally for use in a subterranean wellbore, is made by reacting in aqueous solution (i) an initial polymer with either carboxylic acid or amino groups on its polymer chain, (ii) a second compound with an amino group or carboxylic acid group, and (iii) a coupling agent, so that molecules of the second compound join to the polymer chain through amide groups, thereby forming an aqueous solution of a modified polymer which, without separation from the aqueous solution, participates in cross-linking thereby enhancing viscosity of the solution. The second compound may include hydrophobic groups so that the modified polymer contains hydrophobic groups and is able to cross-link with itself or a viscoelastic surfactant through association of hydrophobic groups (without covalent bond formation) in aqueous solution. Such cross-links can reform after the fluid has been subjected to shear.

18 Claims, 15 Drawing Sheets

(51) Int. Cl.
*C09K 8/74* (2006.01)
*C09K 8/88* (2006.01)

(56) References Cited

U.S. PATENT DOCUMENTS

| | | | |
|---|---|---|---|
| 7,427,583 B2 | 9/2008 | Couillet et al. | |
| 7,704,926 B2 | 4/2010 | Zhou et al. | |
| 8,173,580 B2 | 5/2012 | De Benedictis et al. | |
| 8,389,763 B2 | 3/2013 | Sun et al. | |
| 8,424,603 B2 | 4/2013 | Loveless et al. | |
| 8,691,735 B2 | 4/2014 | Sun et al. | |
| 8,708,045 B2 | 4/2014 | Ogle et al. | |
| 9,266,929 B2 | 2/2016 | Fraser et al. | |
| 2012/0247768 A1* | 10/2012 | Ballard | C09K 8/536 166/294 |
| 2014/0155305 A1 | 6/2014 | Hartshorne et al. | |
| 2015/0129225 A1* | 5/2015 | Ghorbani | E21B 43/16 166/304 |
| 2015/0129226 A1 | 5/2015 | Tustin et al. | |
| 2017/0355902 A1* | 12/2017 | Moloney | F16L 58/1009 |
| 2018/0244977 A1* | 8/2018 | Cortez | E21B 33/138 |

OTHER PUBLICATIONS

Couillet et al., Synergistic Effects in Aqueous Solutions of Mixed Wormlike Micelles and Hydrophobically Modified Polymers, Macromolecules 2005, 38, pp. 5271-5282.

Coveney et al., Novel Approaches to Cross-linking High Molecular Weight Polysaccharides: Application to Guar-based Hydraulic Fracturing Fluids, Molecular Simulation vol. 25, 2000, pp. 265-299.

Gong, Jian Ping, Why are double network hydrogels so tough, Soft Matter 2010, 6, The Royal Society of Chemistry 2010, pp. 2583-2590.

Legemah et al., Unusual High-Pressure Tolerance of Polyboronic Crosslinked Gel Under High-Temperature Rheology Condition, SPE173708, SPE International Symposium on Oilfield Chemistry, Apr. 13-15, 2015, The Woodlands, Texas, USA, 15 pages.

Loveless et al., Multifunctional Boronic Acid Crosslinker for Fracturing Fluids, International Petroleum Technology Conference paper, IPTC 17404, Doha, Qatar, Jan. 2014, 14 pages.

Parris et al., Influence of Pressure on Boron Cross-Linked Polymer Gels, Macromolecules, 2008, 41, pp. 8181-8186.

Pererea et al., Hydrophobic Thiolation of Pectin with 4-Aminothiophenol: Synthesis and In Vitro Characterization, American Association of Pharmaceutical Scientists, PharmSciTech, Mar. 2010, 11, pp. 174-180.

Pezron et al., Complex Formation in Polymer-Ion Solutions. 1. Ploymer Concentration Effects, A3:B16 Audebert, R. Macromolecules 1989, vol. 22, pp. 1169-1174.

Roy et al., Glucose-Sensitivity of Boronic Acid Block Copolymers at Physiological pH, B. S. ACS Macro Lett. 2012, 1, pp. 529-532.

Sun et al., High Efficiency Boron Crosslinkers for Low-Polymer Fracturing Fluids, SPE 140817, SPE International Symposium on Oilfield Chemistry, The Woodlands, Texas, USA, Apr. 2011, 9 pages.

Taurs et al, Readily Prepared Dynamic Hydrogels by Combining Phenyl Boronic Acid- and Maltose-Modified Anionic Polysaccharides at Neutral pH., Macromolecular Rapid Communications, 2014, 35, pp. 2089-2095.

Search Report and Examination Opinion issued in GB patent application GB 1903800.9 dated Jun. 18, 2019, 8 pages.

* cited by examiner

VISCOSIFICATION OF AQUEOUS SOLUTIONS

CROSS-REFERENCE TO RELATED APPLICATIONS

This application claims the benefit of, and priority to, UK Patent Application No. 1903800.9, filed Mar. 20, 2019, which application is incorporated herein by this reference in its entirety.

BACKGROUND

Aqueous liquids can be viscosified with a polymer which may itself act as a thickener, but which is cross-linked with a cross-linking agent in order to increase viscosity further. There are many industries and products where thickening of aqueous liquid is desired. One area of application is in connection with the extraction of hydrocarbons such as oil and natural gas from a subterranean reservoir by means of a drilled well that penetrates the hydrocarbon-bearing reservoir formation. In this field, one commercially very significant application of thickened fluids is for hydraulic fracturing of the formation. Viscosity of the fluid assists in controlling leak-off of the fluid into the formation and it facilitates the suspension of proppant material in the fluid for that material to be carried into the fracture and remain there holding the fracture open when the hydraulic pressure is released.

Further applications of thickened fluids in connection with hydrocarbon extraction are acidizing, control of fluid loss, diversion, zonal isolation, and the placing of gravel packs. Gravel packing is a process of placing a volume of particulate material, frequently a coarse sand, within the wellbore and possibly extending slightly into the surrounding formation. The particulate material used to form a gravel pack may be transported into place in suspension in a thickened fluid. When it is in place, the gravel pack acts as a filter for fine particles so that they are not entrained in the produced fluid.

A viscosified fluid used in a subterranean operation, in particular a fracturing or gravel packing fluid which is required to suspend solid particles may be a thixotropic, i.e. shear thinning, fluid which is a gel when it is not moving but which can flow under shear.

Common examples of polymeric thickening agents used in the thickened fluids mentioned above are galactomannan gums, in particular guar and substituted guars such as hydroxypropyl guar and carboxymethylhydroxypropyl guar, cellulosic polymers such as hydroxyethyl cellulose and other polysaccharides. Crosslinking of the polymeric materials then serves to increase the viscosity and proppant carrying ability of the fluid, as well as to increase its high temperature stability. Available crosslinking agents include soluble boron, zirconium, and titanium compounds. Compounds of other metals have also been used.

The viscosity of these crosslinked gels can be reduced by mechanical shearing (ie they are shear thinning) but gels cross-linked with boron compounds have the advantage that they will reform spontaneously after exposure to high shear. This property of being reversible makes boron-crosslinked gels particularly attractive and they have been widely used. Thus boric acid, inorganic borate salts and condensed salts such as borax are well established as cross-linking agents for guar and other polymers used to thicken wellbore fluids. A limitation is that inter-molecular guar crosslinks will only occur if individual guar molecules are close enough to each other for the borate to span the inter-chain gap. This results in a requirement for the guar concentration in solution to exceed a minimum concentration which is the critical overlap concentration (C*).

Example literature related to cross-linking with organic compounds or nanoparticles which contain a plurality of boronic acid groups includes: Coveney et al., "Novel Approaches to Cross-linking High Molecular Weight Polysaccharides: Application to Guar-based Hydraulic Fracturing Fluids", Molecular Simulation, vol. 25, pp. 265-299 (2000) and Sun and Qu: "High Efficiency Boron Cross-linkers for Low-Polymer fracturing Fluids", Society of Petroleum Engineers, SPE 140817. Other disclosures of organic compounds containing a plurality of boronic acid groups are U.S. Pat. Nos. 7,405,183, 8,389,763, 8,691,735, and 8,708,045. Crosslinking by means of a polymeric compound containing a plurality of boronic acid groups has been discussed in Loveless et al, International Petroleum Technology Conference, IPTC 17494 and U.S. Pat. No. 8,424,603 and in US Patent Publication No. 2015/0129226 which shows reductions in concentrations of guar and of boron relative to a fluid thickened with guar and inorganic borate. US Patent Publication No. 2014/0155305 discusses cross-linking with a polymer containing boroxazole rings.

Legemah et al, SPE 173708 discusses the use of guar cross-linked with certain organic compounds containing aminoboronate groups retained its viscosity under pressure, contrasting with the loss of viscosity under pressure which has been observed with guar cross-linked by inorganic borate.

These disclosures of organic crosslinking agents containing boronic acid groups have called for chemical reaction in a non-aqueous solvent so that there would also be a need for separation of the product before use. Practical implementation is then likely to be manufacture at a chemical plant followed by transportation to the place of use where the cross-linking agent would be dissolved or dispersed in aqueous solution.

Use of hydrophobically modified polymers to viscosify aqueous solutions has been discussed in some detail in U.S. Pat. Nos. 4,529,523 and 9,266,929. U.S. Pat. No. 7,427,583 discloses use of a hydrophobically modified polymer together with a viscoelastic surfactant so that hydrophobic chains of the polymer interact with the surfactant to produce a viscoelastic gel containing less surfactant than would otherwise be required. A practical issue with any system which requires mixing a hydrophobically modified polymer with aqueous solution is that mixing is a slow and difficult process.

SUMMARY

Disclosed here is a method of making a viscosified aqueous solution. The method includes reacting, in an aqueous solution, (i) an initial polymer which includes functional groups which are carboxylic acid or amino groups, (ii) a second compound including at least one functional group which is an amino group or carboxylic acid group, different to the functional groups on the initial polymer, and (iii) a coupling agent such that the functional groups on the polymer and second compound are made to form amide groups attaching molecules of the second compound to the initial polymer thereby forming a modified polymer in aqueous solution. This reaction causes or allows the polymer, without separation from the aqueous solution, to participate in cross-linking which enhances viscosity of the aqueous solution.

Enhancing viscosity in this way may be done without separating the modified polymer from the aqueous solution in which it was formed and also without separating from other products of the reaction. Thus the method may be performed without separating or purifying products of reaction.

Participation in cross-linking can happen in several ways. One possibility is that the second compound is such that residues of the second compound in the modified polymer are able to attach to, and cross-link, further material included in the solution and by so doing increase the viscosity of the aqueous solution.

The further material may be another polymer distinct from the initial polymer and modified polymer and which is extended or cross-linked by the modified polymer. In this latter case, one possibility is that the second compound comprises a functional group which is able to attach covalently to such a second polymer. Covalent attachment may be a reversible reaction, in which case the attachment may be referred to as having dynamic covalent character. This functional group which originates from the second compound may be a boron-containing group able to react with a diol group on a second polymer. Another possibility is that a further material to which the modified polymer attaches is a viscoelastic surfactant which forms worm-like micelles in the aqueous solution. In this case attachment of modified polymer to the surfactant molecules, which may be attachment to a hydrophobic group within the surfactant molecule, connects surfactant micelles to one another, increasing the solution viscosity. A viscoelastic surfactant may be a surfactant which includes a cleavable group, so that the surfactant is decomposed within a period of time after the viscosified solution is initially formed, as disclosed in U.S. Pat. No. 7,704,926.

The reaction of polymer, second compound and coupling agent to form the modified polymer and the attachment of modified polymer to further material may take place in sequence or may take place concurrently.

In some forms of the method a further material to which the modified polymer attaches is not required. It is possible that residues of the second compound in the modified polymer can join together to cross-link the modified polymer. This joining together may be formation of covalent bonds. Another possibility is that the second compound has a characteristic which gives residues of the second compound an affinity for each other. More specifically this may be a hydrophobic group which is part of the second compound and these hydrophobic groups associate together in the polar environment provided by aqueous solution, without forming covalent bonds.

Thus, the second compound may be such that the reaction of the second compound with the initial polymer leads to a modified polymer containing hydrophobic groups in residues of the second compound and these hydrophobic groups enable the modified polymer to cross-link with itself and/or with a further material which contains hydrophobic groups, through association of the hydrophobic groups. Cross-linking through association of hydrophobic groups in the polar environment of aqueous solution may take place without any formation of covalent bonds.

We have now found that cross-linking through association of hydrophobic groups is advantageous in that (i) it can provide effective, viscosity enhancing, cross-linking and (ii) the cross-links can reform after separation through shear, providing a property of shear-recovery analogous to that observed with guar which is dynamically crosslinked with borate, yet without boron present.

Conventional fluids viscosified with guar crosslinked with inorganic borate become less viscous as temperature increases. They also become less viscous when under pressure, as reported by Parris et al, Macromolecules, vol. 41, pp. 8181-8186 (2008). We have now found that the viscosity of gels which are cross-linked through association of hydrophobic groups has less sensitivity to temperature and pressure than borate-crosslinked guar.

Cross-linking by association of hydrophobic groups in aqueous solution has further advantages. It can provide cross-linking at mild pH, rather than requiring an alkaline solution as required for borate to cross-link guar. Cross-linking can be disrupted by contact with oil (i.e., is responsive to oil) which can be useful for some operations in a well, such as hydraulic fracturing, where the intention is that the aqueous solution pumped into the well should not impede, but rather should improve, the eventual flow of oil from the fractured formation to the surface.

In a further development, a second compound is such that residues of the second compound in the modified polymer undergo slow change with a consequence that viscosification occurs but subsequently declines over a period of time. This can also be useful for some operations in a well, such as hydraulic fracturing, where the fluid pumped into the well is required to flow back to the surface after the formation of fractures and proppant placement.

A viscosified aqueous solution as disclosed here may take the form of a gel when it is under quiescent or low shear conditions and may be effective for suspending particulate material. A viscosified aqueous solution as disclosed here may be used in a procedure at a subterranean location accessed by a drilled well. Hydraulic fracturing is an example. In some forms of the methods disclosed here, the reaction to form the modified polymer and/or participation of the modified polymer in cross-linking may take place after an aqueous solution has been pumped into a well or while it is being pumped into a well.

Consequently, a second aspect of the present disclosure is a method of providing a viscosified aqueous fluid at a subterranean location accessed by a borehole, the method comprising pumping down the borehole in aqueous solution, without separating products of reaction from the solution, a reactive combination of (i) an initial polymer which comprises a polymer chain with functional groups distributed along the polymer chain, the functional groups being either carboxylic acid or amino groups; (ii) a second compound comprising at least one functional group which is either an amino group or carboxylic acid group; and (iii) a coupling agent, so that reaction thereof attaches molecules of the second compound to the initial polymer through amide groups formed from the functional groups, thereby forming an aqueous solution of a modified polymer and the modified polymer participates in cross-linking through the amide groups and second compound, thereby enhancing viscosity of the solution.

The coupling agent used in the formation of amide groups may be a compound which reacts with one functional group to form a reactive intermediate which then undergoes further reaction in which the other functional group participates so as to form an amide group. Some coupling agents are compounds which incorporate an —N—C—N— moiety in which the nitrogen-carbon bonds are unsaturated.

Another aspect of the present disclosure can be stated as a novel method of making a viscosified aqueous solution, comprising reacting an initial polymer with a second compound which comprises at least one thiol group, thereby forming a modified polymer wherein attached residues of the second compound comprise thiol groups, and causing or allowing the thiol groups to form disulphide groups, thereby cross-linking the modified polymer and increasing the viscosity of the aqueous solution.

A further aspect of the present disclosure can be stated as a novel method of making a viscosified aqueous solution, comprising reacting in aqueous solution an initial polymer which is water soluble, and a second compound which includes at least one hydrophobic group, thereby forming an aqueous solution of a modified polymer wherein attached residues of the second compound comprise hydrophobic groups and, possibly without separating the modified polymer from the aqueous solution, causing or allowing association of hydrophobic groups to cross-link the modified polymer with itself or with a further material which comprises hydrophobic groups and thereby increase the viscosity of the aqueous solution. Cross-linking through association of hydrophobic groups may take place without any formation of covalent bonds.

Yet another aspect of the present disclosure is a novel method of making a viscosified aqueous solution, comprising reacting in aqueous solution an initial polymer and a second compound which comprises a hydrophobic group, and causing or allowing association between hydrophobic groups on the modified polymer and hydrophobic portions of a viscoelastic surfactant in aqueous solution, thereby to increase the viscosity of the aqueous solution.

The reaction of polymer, second compound and coupling agent to form the modified polymer and the association of modified polymer with viscoelastic surfactant may take place in sequence or may take place concurrently and the association with viscoelastic surfactant may take place without separating the modified polymer from the aqueous solution in which it is formed.

In these further aspects above, the reaction of the initial polymer and the second compound may be carried out using a coupling agent, which may be a water soluble coupling agent used in aqueous solution, to form the modified polymer and the cross-linking of modified polymer may take place subsequently or may take place concurrently with reaction of the initial polymer. The cross-linking may take place without separating the modified polymer from the aqueous solution in which it is formed. An advantage of this aspect of the invention is that the initial polymer can be dissolved in aqueous solution before modification of this polymer by the reaction with second compound brings about crosslinking and/or makes it hydrophobic.

DETAILED DESCRIPTION

Figure 1:
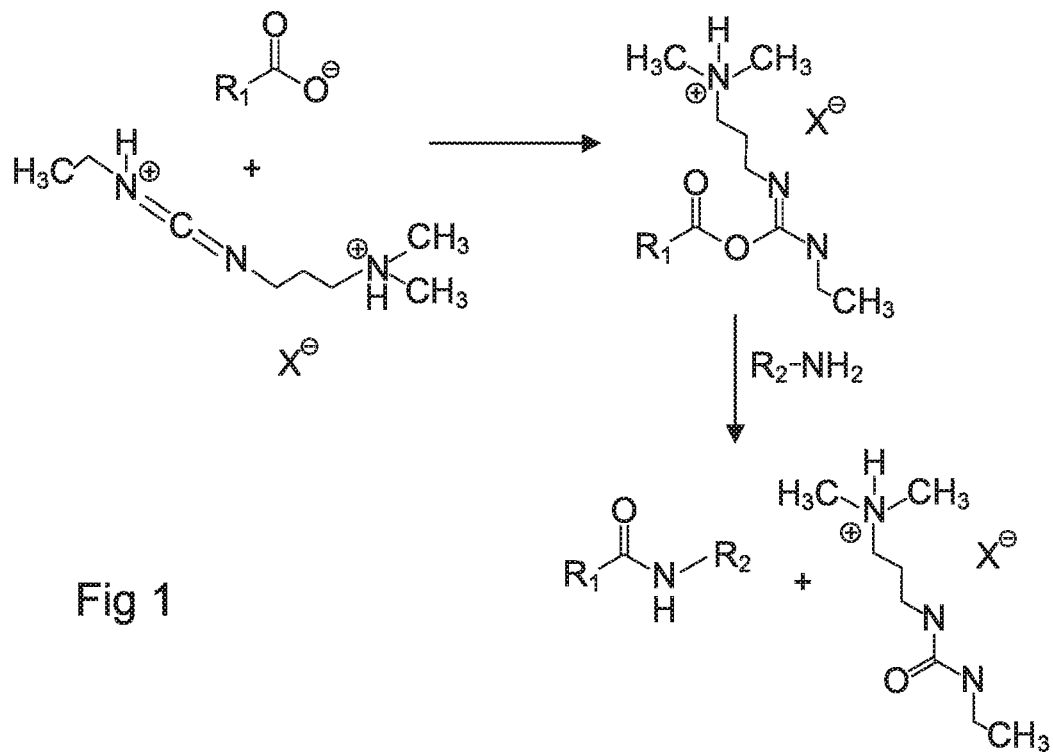
FIG. 1 shows a reaction scheme using a water-soluble coupling agent.

Methods disclosed here employ the formation of an amide link by means of a coupling agent which enables an amide group to be formed under mild conditions. It may be formed in aqueous solution.

One starting material for this reaction is a polymer, referred to here as the initial polymer, which has functional groups on its polymer chain. These functional groups are either amino groups or carboxylic acid groups. Examples of polymers which include carboxylic acid groups include: carboxymethyl cellulose, carboxymethyl guar, carboxymethyl hydroxypropyl guar, carboxymethyl dextran, carboxymethyl cellulose, carboxymethyl chitosan, xanthan, partially hydrolysed poly(acrylamide), poly(acrylic acid), poly(methacrylic acid) and copolymers of acrylic and/or methacrylic acid.

Examples of polymer containing an amino group include: polyallylamine, poly(4-aminostyrene) and chitosan which is a polymer of glucosamine derived by deactylation of the natural material chitin.

The initial polymer may have a mean molecular weight of at least 3 kDa or at least 5 kDa, possibly higher such as at least 50 or 100 kDa or even higher such as at least 500 kDa. This mean molecular weight may be a viscosity average molecular weight and in at least some instances the initial polymer may have a mean molecular weight in a range from 3 kDa to 3 MDa.

We have observed that gels may be formed with a low concentration of initial polymer, in particular when the modified polymer formed from the initial polymer interacts with a further material. Consequently the solubility of the initial polymer in deionised water may be at least 1 gm/litre (0.1 wt %). In a number of embodiments, the initial polymer may have a solubility in deionised water of at least 5 or at least 10 gm/litre (0.5 or 1 wt %).

The second compound used in the reaction contains a functional group which is also an amino group or a carboxylic acid group. Of course, this must be complementary to (and therefore different from) the functional group on the initial polymer, so that if the polymer comprises carboxylic groups the second compound comprises amino groups and vice-versa.

For some forms of the method, the second compound may have a molecular weight which is no more than 1000 Daltons and it may contain a single amino or carboxylic acid group or, possibly, two to four such groups. Such a compound may contain an aromatic ring or ring system with the amino group or carboxylic acid group as a substituent on the ring. In this case, some compounds which may be used can be classed as substituted anilines or substituted benzoic acids.

The second compound may be water soluble although it is possible that a second compound which has low water solubility could be used in conjunction with a surfactant to solubilise the compound. In some embodiments, the second compound may have a solubility in deionised water of at least 0.1 gm/litre (0.01 wt %).

A coupling agent is used to bring about reaction of the initial polymer and the second compound. Formation of an amide group by direct reaction of a carboxylic acid group and an amino group does not take place at ambient temperatures. A coupling agent brings about the desired amide group formation by initial reaction with one functional group, such as the carboxylic acid group, to create an intermediate which then undergoes further reaction, or possibly more than one further reaction, in which the other functional group participates and an amide group is formed. In some forms of the method, the coupling agent reacts with a carboxylic group on the initial polymer to form an intermediate which then reacts with an amino group on the second compound.

A coupling agent may be a compound with a molecular weight no greater than 1000 Daltons and may have a water solubility of at least 0.1 gm/litre or at least 1 gm/litre (at least 0.01 or 0.1 wt %). However, it is also possible that a coupling agent could be solubilised with surfactant or could be immobilised to water insoluble polymer in an arrangement where an aqueous solution of the initial polymer and second compound is made to flow into contact with the immobilised coupling agent.

One class of compounds which are effective as coupling agent are carbodiimides. These have the general formula:

$$R_a\text{—}N\text{=}C\text{=}N\text{—}R_b$$

where $R_a$ and $R_b$ denote organic groups. Carbodiimides can be made from isocyanates by a reaction described by Monagle et al in J. Am. Chem. Soc. vol 84, pages 4288-4295 (1962). For the present methods, the groups $R_a$ and $R_b$ are such that the compound is water soluble. One suitable water-soluble carbodiimide is 1-ethyl-3-(3-dimethylaminopropyl)carbodiimide (EDC) which has the structure:

A synthesis of this compound was given by Sheehan et al in J. Org. Chem. vol 26 page 2525

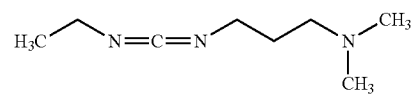

(1961). This compound is commercially available from Sigma-Aldrich Corporation (UK) as is 1-[3-(dimethylamino)propyl]-3-methylcarbodiimide methiodide which has the structure:

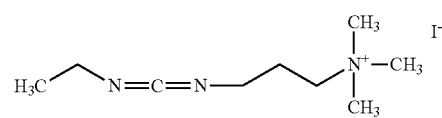

Sheehan et al, J. Org. Chem., vol. 21, pp. 439-441 (1956) mentions several other water-soluble carbodiimides.

Water-soluble carbodiimides may contain a nitrogen atom in one of the groups $R_a$ and $R_b$ this may be a nitrogen atom in a dimethyl amino alkyl group as in EDC (above) or in a morpholinoalkyl group. Some water soluble carbodimides with oxygen but not nitrogen in the groups $R_a$ and $R_b$ have been reported by Wang et al, Scientia Sinica Series B, vol. 30, pp. 449-459 (1987).

Reaction using a carbodiimide coupling agent is sensitive to pH of the reaction mixture. The stages of reaction when the carbodiimide is EDC are shown in FIG. 1. The first step is that an ionised carboxylate group (which is part of the initial polymer or second compound) reacts with the central carbon atom of the —N—C—N— moiety of the coupling agent while the carbodiimide is in protonated form. In the case of EDC, the protonated species is actually the dication as shown in FIG. 1 where $X^-$ denotes a counterion. An intermediate which is an O-acyl isourea is formed. The pH conditions for carbodiimide protonation and carboxyl ionization overlap to a limited extent and a pH range of 4.50-4.75 would be optimal for formation of the O-acylisourea intermediate.

The subsequent reaction of the O-acylisourea intermediate with an amine is a nucleophilic substitution for which the amine is desirably unprotonated so as to maintain its nucleophilicity. However, at pH 4.50-4.75 which is optimal for O-acylisourea formation, the primary amine would largely be in protonated form. We have found that reaction to form amide groups using EDC as coupling agent can be carried out at a pH of 5.50-6.00 when the initial polymer contains carboxyl groups and the second compound is an aromatic amine. The conjugated acids of aniline derivatives typically exhibit a lower $pK_a$ than those of the conjugated acids of aliphatic amines.

Thus some forms of the methods disclosed here have the advantage that the reaction of the initial polymer, second compound and coupling agent in aqueous solution can be carried out at a pH in a range from pH 5.0 to pH 8.0 or from pH 5.0 to pH 7.5. One advantage of keeping pH below 8.0 in the context of compositions pumped into a well is that it can avoid precipitation of insoluble materials such as hydroxides of divalent cations.

When using a carbodiimide coupling agent and an initial polymer which contains carboxylate groups we have found it possible to use a second compound which contains aromatic amino groups in an amount which is not more than 1.5 times possibly not more than 1.3 times the calculated stoichiometric amount for reaction with carboxylate groups on the initial polymer. In some forms of the methods disclosed herein the amount of the second compound is less than the calculated stoichiometric amount for reaction with carboxyl groups on the initial polymer so that after reaction there must inevitably be some unchanged carboxyl groups on the modified polymer. In a number of embodiments of the methods disclosed here, the amount of second compound which is brought into contact with the second polymer for reaction is in a range from 10% to 90% of the calculated stoichiometric amount for reaction with carboxylate groups on the initial polymer, and sometimes in the narrower range from 10% to 50% of the calculated stoichiometric amount.

As regards the amount of coupling agent, we have found it is possible to use an amount of coupling agent which is not more than 1.5 times, possibly not more than 1.3 times the stoichiometric amount required to bring about the combination of all the second compound with the initial polymer. For instance, if the calculated stoichiometric amount of second compound for reaction with initial polymer is y moles and the amount of second compound actually used is 0.5y moles, there may be no more than 0.75y moles of coupling agent.

The amount of viscosifying material in the aqueous solution which is made, that is the total amount of initial polymer, second material and any further material which participates in cross-linking with the modified polymer, may be in a range from 0.5 to 10 gm/litre. The amount of second compound used may be such that the concentration of the second compound present, including both reacted residues of the second compound and unreacted second compound, in the viscosified aqueous solution is at least 1 millimole per liter. The amount may possibly be up to 10 or 20 millimoles per liter.

Reaction using a coupling agent may proceed very rapidly. However, regardless of the time allowed for reaction, and even if the amount of the second compound is less than the stoichiometric amount for reaction with functional groups on the initial polymer, the reaction may not attach all of the second compound to the initial polymer. We have observed, by means of elemental analysis of modified polymers made using coupling agents as described below, that between 15 and 60% of the available second compound is attached to the initial polymer.

Reaction with a coupling agent may be carried out in the presence of an additive which reacts with the O-acylisourea intermediate to form a more stable second intermediate which then undergoes reaction to give the desired amide groups. An example of such an additive is N-hydroxysuccinimide which has the structure:

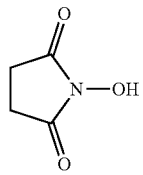

Figure 2:
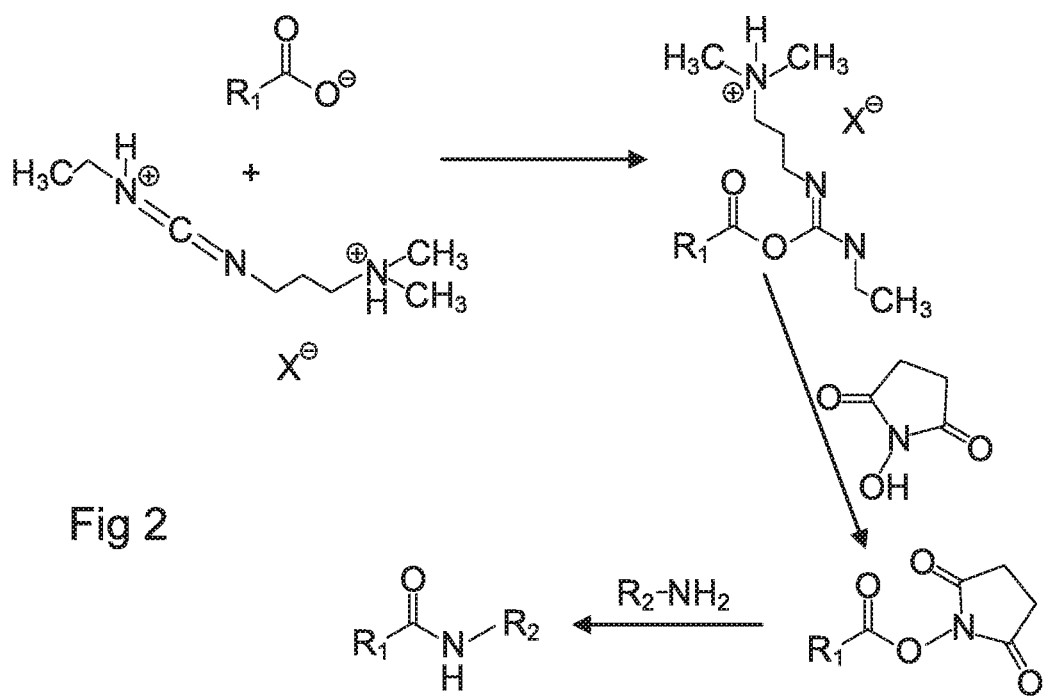
FIG. 2 shows the modified form of the scheme of FIG. 1 when N-hydroxysuccinimide is present.

This reacts with the O-acylisourea intermediate to form a second intermediate as shown in FIG. 2. This second intermediate then undergoes nucleophilic substitution by reaction with the amino group as also shown in FIG. 2.

N-hydroxysulfosuccinimide sodium salt which has the structure:

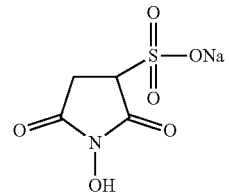

may be used in the same way. Another possible additive is 1-hydroxy 1H-benzo triazole which has the structure:

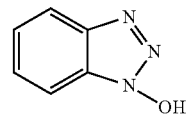

and which also reacts with the O-acylurea intermediate to form a second intermediate.

Figure 3:
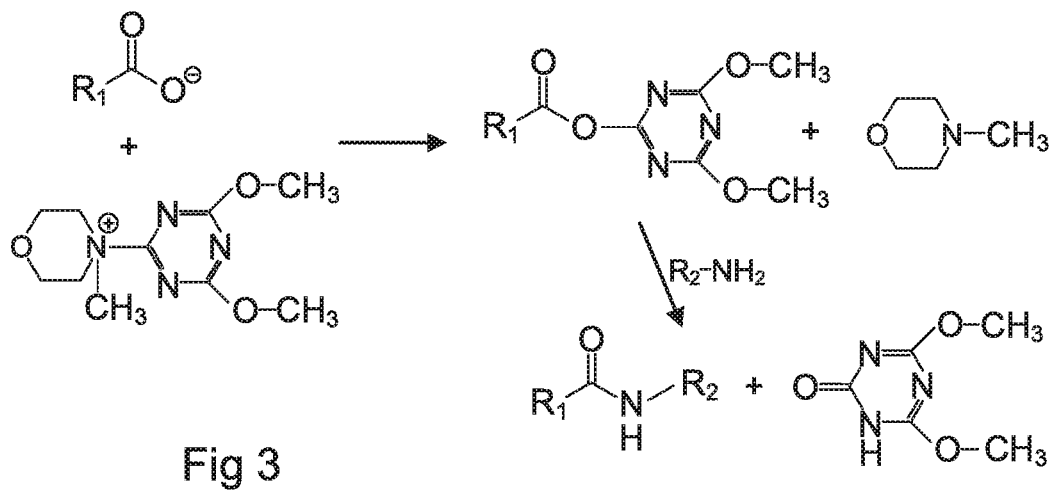
FIG. 3 shows a reaction scheme using another water-soluble coupling agent.

Other coupling agents may be used. One possibility is a compound containing the six-membered triazine ring. The compound 4-(4,6-dimethoxy-1,3,5-triazin-2-yl)-4-methylmorpholinium chloride is a water-soluble triazine and brings about coupling by reaction as shown in FIG. 3. In the first stage of the reaction, a carboxylate ion reacts with the coupling agent to form the reactive intermediate shown, and N-methyl morpholine is displaced. This intermediate then reacts with the amine to form an amide group.

It will be recognised that a carbodiimide coupling agent and a triazine coupling agent both incorporate an —N—C—N— moiety in which the carbon-nitrogen bonds are unsaturated and a reactive intermediate is formed by reaction of a carboxylate ion with the central carbon atom of the —N—C—N— moiety.

After the second compound has been attached to the initial polymer, methods as disclosed here can proceed in a number of ways. Some of these utilise a further material which is cross-linked by reaction with the modified initial polymer and the resulting cross-linked product viscosifies the aqueous solution. Others use the modified initial polymer as the only polymer which viscosifies the aqueous solution. Some of these implementations of the method are shown diagrammatically in FIGS. 4 to 8.

Figure 4:
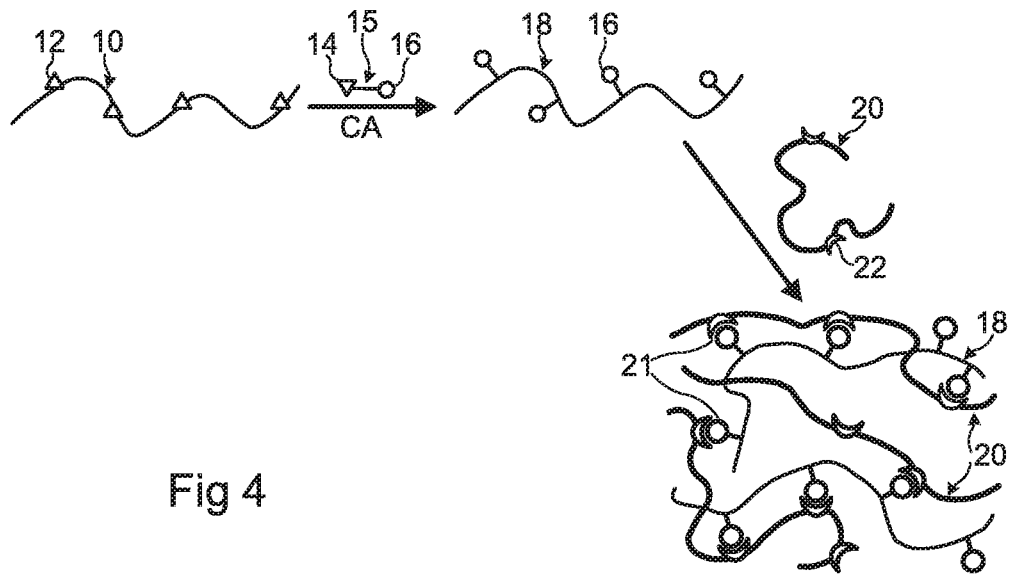
FIGS. 4 to 8 diagrammatically illustrate a number of possibilities for cross-linking in the methods disclosed.

In the scheme shown in FIG. 4, an initial polymer 10 bearing functional groups 12 which are carboxylate or amino groups and which are depicted diagrammatically as triangles is reacted with a second compound 15 using a coupling agent (CA) in aqueous solution as discussed above and leading to the formation of modified polymer 18. The second compound has a functional group 14 which is different to the group 12. It is an amino or carboxylate group and is depicted as an inverted triangle. The second compound 15 also contains another functional group 16 which does not react at this stage and becomes part of the residues of the second compound in the modified polymer 18. The solution of modified polymer 18 is mixed with a solution of a further polymer 20. The groups 18 attach to reactive sites 22 on the polymer 20, cross-linking this polymer 20 as indicated at 21 and forming a cross-linked mixture of polymers which enhances the viscosity of the aqueous solution.

Figure 5:
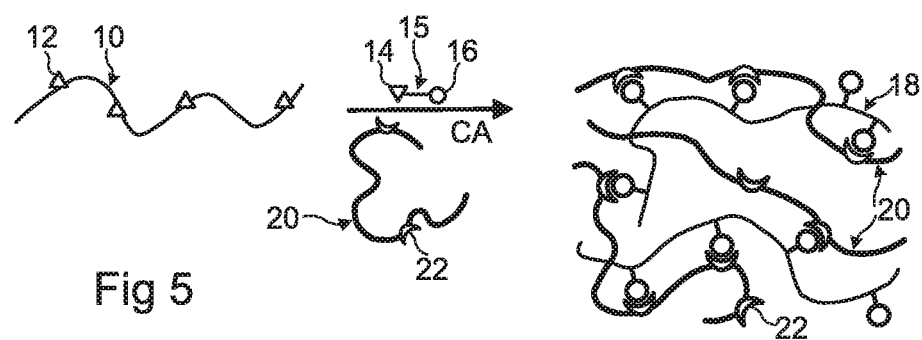

FIG. 5 shows a variant on the scheme of FIG. 4. The materials and reactions are the same as in FIG. 4, but the reaction of the initial polymer 10, second compound 15 and coupling agent takes place in the presence of the thickening polymer 20 so that as the modified polymer 16 is formed, it is used for cross-linking of the polymer 20.

Figure 6:
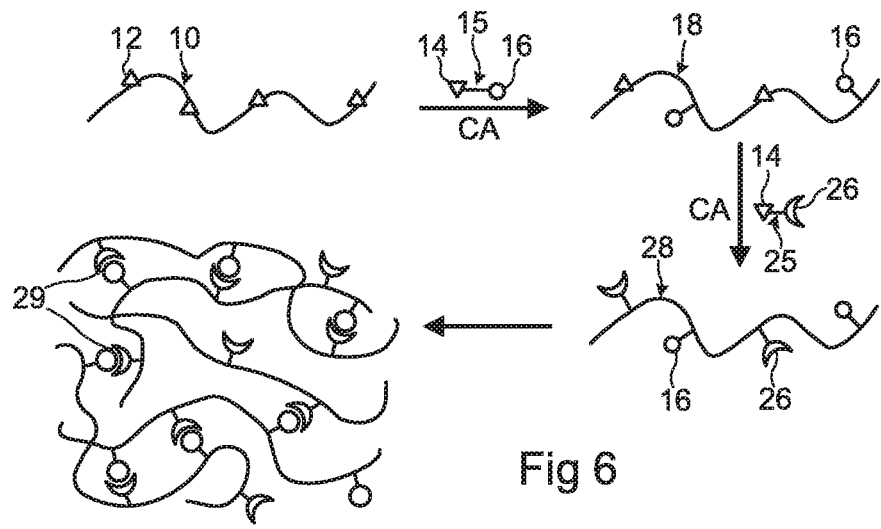

In the scheme shown in FIG. 6 the initial polymer 10 is the only polymer used. The reaction of the initial polymer 10 and the second compound 15 which has functional groups 14 and 16 forms modified polymer 18 which retains some unreacted functional groups 12. This is followed by reaction of the modified polymer 18 with a third compound 25 which contains functional groups 14 and functional groups 26. This compound 25 is also attached through amide groups by means of a coupling agent (CA) so as to form a further modified polymer 28. The functional groups 16 and 26 can react together leading to cross-linking of the further modified polymer 28 as indicated at 29.

Reaction of the functional groups 16, 26 to crosslink the further modified polymer 28 takes place in a subsequent step as shown. This may be brought about by a change in pH of the aqueous solution containing the further modified polymer 28. However, it is also possible that reaction of the modified polymer 18 with the third compound 25 could be accompanied by spontaneous concurrent cross-linking of the further modified polymer 28.

Figure 7:
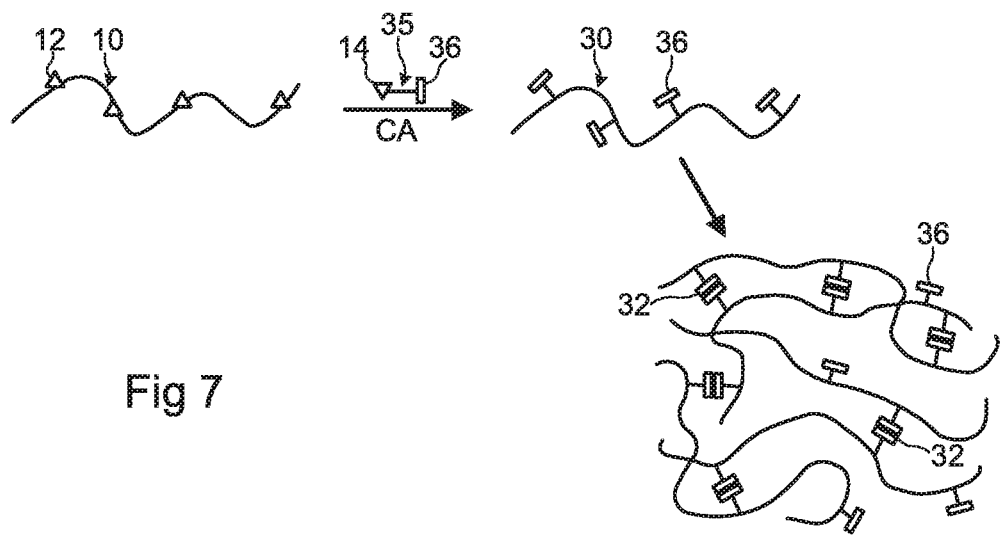

FIG. 7 shows another scheme. As in FIG. 4 an initial polymer 10 bearing functional groups 12 which are carboxylate or amino groups and which are depicted diagrammatically as triangles is reacted with a second compound 35 using a coupling agent in aqueous solution. The second compound has a functional group 14 depicted as an inverted triangle which is an amino or a carboxylate group and which reacts with functional groups 12 on the initial polymer 10 as in FIG. 4. This leads to formation of modified polymer 30. The second compound 35 also has other functional groups 36 which become attached to the polymer chain in the modified polymer 30 and can react with each other to crosslink the modified polymer 30, as indicated at 32. This cross-linking may be brought about in a subsequent step as shown, for instance through a change in pH or addition of another reagent, but it is also possible that reaction of the initial polymer 10 with the second compound 35 could be accompanied by spontaneous concurrent cross-linking of the modified polymer 30.

Figure 8:
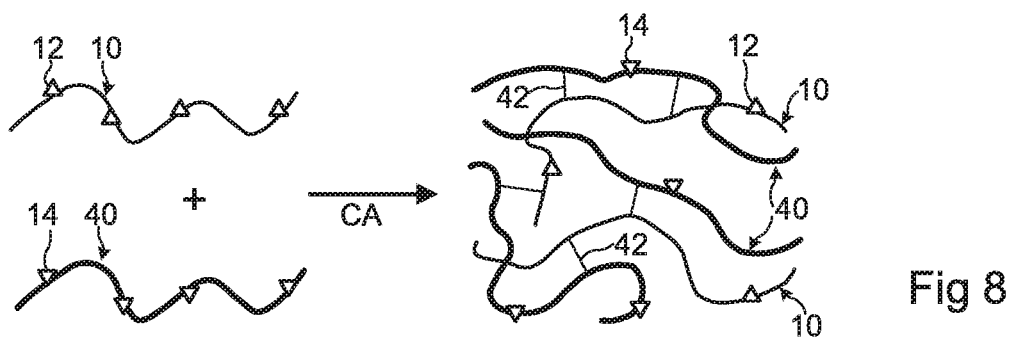

FIG. 8 shows a further scheme. The initial polymer 10 bears functional groups 12 which are carboxylate or amino groups and which are depicted diagrammatically as triangles as in FIG. 4. The second compound is a polymer 40 which bears functional groups 14 represented as inverted triangles, which are amino groups or carboxylate groups, conversely to groups 12. The polymers are mixed in the presence of coupling agent (CA) and become cross-linked. Crosslinks containing an amide group formed from a group 12 and a group 14 are indicated at 42.

EXAMPLES

A number of examples were carried out to illustrate the methods disclosed here and in particular the chemical reactions taking place. Some of the materials used are listed in Table 1 below and subsequently referred to by the abbreviations shown. The polymers are available from a number of suppliers. Other reagents were supplied by Sigma-Aldrich Corporation (UK) unless stated otherwise.

TABLE 1

Materials used

| | |
|---|---|
| Initial polymers with carboxylic acid groups | |
| CMC1400 | Carboxymethyl cellulose with weight average molecular weight ($M_w$) of 1400 kDa and a degree of substitution (DS) of 0.85 |
| CMC700 | Carboxymethyl cellulose with $M_w$ of 700 kDa (CMC700) and a DS of 0.90 |
| CMC250 | Carboxymethyl cellulose with $M_w$ of 250 kDa (CMC250) and a DS of 0.90 |
| CMHPG | Carboxymethyl hydroxypropyl guar with a DS of 0.3 to 0.5 |
| HPAM120 | Partially hydrolyzed polyacrylamide with a viscosity-average molecular weight ($M_v$) of 12.0 MDa and a hydrolysis degree of 30%. |
| HPAM200 | Partially hydrolyzed polyacrylamide with a viscosity-average molecular weight ($M_v$) of 20.0 MDa and hydrolysis degree of 30%. |
| Second compound with amino group | |
| 2APBA | 2-aminophenylboronic acid hydrochloride |
| 3APBA | 3-aminophenyl boronic acid monohydrate |
| aminoPEG | Tetra-(aminopolyethyleneoxy)erithritol, also termed 4-arm-PEG-amine, with mean molecular weight of 5000 Daltons |
| 4EA | 4-ethylaniline |
| 4HA | 4-hexylaniline |
| 4OA | 4-octylaniline |
| 4ATP | 4-aminothiophenol |
| 4ABZ | 4-aminobenzoic acid |
| 4AD | 4-Aminobenzene-1,2-diol hydrobromide supplied by Ark Pharm Inc., USA |
| Coupling agents | |
| EDC | N-(3-dimethylaminopropyl)-N'-ethylcarbodiimide hydrochloride |
| DMTMM | 4-(4,6-dimethoxy-1,3,5-triazin-2-yl)-4-methylmorpholinium chloride |
| Further material to which modified polymer attaches | |
| Guar | Guar with a number-average molecular weight ($M_n$) of approximately 2500 kDa |
| VES1 | A zwitterionic viscoelastic surfactant which is an erucyl trimethyl ammonium salt |
| Other materials | |
| MES | 4-morpholineethanesulfonic acid |
| NHS | N-hydroxysuccinimide |

Viscosified fluids were examined to determine rheological properties using a Kinexus Ultra rotational rheometer (Malvern Instruments) equipped with a heat exchanger. Measurements of apparent viscosity at various shear rates and temperatures were carried out using a bob and cup geometry. Normal forces were checked to be relaxed prior any measurement.

Storage (G') and loss (G") moduli were determined by subjecting samples to oscillatory shear. Two methods were used. In one form of sweep experiment the evolution of storage (G') and loss (G") moduli was recorded under increasing amplitudes of deformation, at a chosen oscillatory frequency. The other method was an oscillatory frequency sweep, recording the evolution of G' and G" when decreasing the oscillatory frequency, using a strain amplitude that ensures a linear response. This strain amplitude was within the linear viscoelastic (LVE) regime (determined previously by dynamic strain sweep measurements).

The viscosity of a fluid when flowing may be indicated by its viscosity at a shear rate of 25 or 100 $\text{sec}^{-1}$. In many instances fluids formed gels with sufficient strength to retain their shape rather than flowing as a liquid. A useful measurable characteristic of gel formation is a value of storage modulus (G') which is higher than the value of the loss modulus (G") at intermediate frequencies, such as oscillatory frequencies from 0.1 Hz to 10 Hz. Storage modulus (G') is an indication of the stiffness of a gel, so the higher the storage modulus (G'), the greater is the resistance to deformation.

As will be pointed out in the Examples below, we have found that some gels display high storage modulus under low frequency of oscillation, such as oscillatory frequency below 0.1 Hz and possibly 0.01 Hz or less. This is high storage modulus under quiescent conditions and, in addition to high apparent viscosity at low shear rates, this property is useful for suspending particulate material. Notably it is useful for suspending particulate proppant in a hydraulic fracture. Rheological testing at very low oscillatory frequency reflects the behavior of the composition under quasistatic conditions.

In the Examples below, polymer solutions were prepared by adding the polymer powder to water (or aqueous solution), which was stirred in a 1 L Waring blender cup at approximately 2000 rpm. Some reactions were carried out in a flask equipped with a magnetic stir bar. A magnetic stirrer was employed to stir the reacting mixture at approximately 1000 rpm. In some of the Examples reaction was performed directly in a Waring blender cup after polymer hydration or in the measuring cup of a rheometer after mixing the reactants in solution.

Preliminary Experiments.

A number of preparations of a modified polymer were carried out in accordance with the scheme shown in FIG. 4 using carboxymethyl cellulose (CMC) as the initial polymer, 3-aminophenylboronic acid hydrochloride (3APBA) as the second polymer and N-(3-dimethylaminopropyl)-N'-ethylcarbodiimide hydrochloride (EDC) as the coupling agent. Reaction was carried out in a flask with a magnetic stirrer, the reaction mixture was allowed ample time to reach completion and the resulting polymer was isolated. This polymer was then used to cross-link a guar solution.

The experimental procedure was as follows: carboxymethyl cellulose which was either CMC 1400 or CMC 700 as in the table below (800.0 mg) was dissolved in MES buffer (200.0 mL, pH approximately 5.7). Then, amounts of 3APBA and EDC as shown in Table 2 below were added to the polymer solution. The final mixture was stirred at room temperature (RT) for 24 hours. The modified carboxymethyl cellulose was purified by dialysis (Spectrum dialysis membrane with a molecular weight cutoff of 50 kDa) for 5-7 days in a dark environment at room temperature against deionized water (dialysate was exchanged on a regular basis). The pure polymer sample was then obtained by freeze drying. The modified polymers are referred to by code numbers in the first column of Table 2.

TABLE 2

Amounts of 3 APBA and EDC reacted with 800 mg CMC

| | 3APBA | | EDC | |
|---|---|---|---|---|
| Designation | mg | mmol | mg | mmol |
| 14A | 433.9 | 2.8 | 536.8 | 2.8 |
| 14B | 170.5 | 1.1 | 210.9 | 1.1 |
| 14C | 93.0 | 0.6 | 115.0 | 0.6 |
| 7C | 93.0 | 0.6 | 115.0 | 0.6 |
| 7D | 31.0 | 0.2 | 38.3 | 0.2 |

The stoichiometric quantity of 3APBA which would be required to react with all the carboxy groups on the CMC was calculated as approximately 3.1 mmole which is 480 mg. It can thus be recognised that in these preparations of modified polymer, the quantity of the second compound (3APBA) was less than the stoichiometric amount required to convert all carboxy groups of the polymer to amide groups. As indicated in Table 2 above, the amount of coupling agent was stoichiometrically equal to the amount of the second compound and therefore was the amount which would be required to bring about complete reaction between the CMC and 3APBA. However, it is possible that reaction was not complete in which case unreacted 3APBA would have been removed along with reaction by-products in the subsequent purification.

Aqueous solutions of each of these modified carboxymethylcellulose polymers were utilized to crosslink guar in a series of tests as follows. Guar (800.0 mg) was dissolved in deionized water (200.0 mL). The modified carboxymethylcellulose polymers (800.0 mg) were dissolved in deionized water (200.0 mL) so that the solutions of guar and modified CMC both contained 0.4 wt % polymer. Quantities of the guar solution and solutions of each modified carboxymethylcellulose were mixed in proportions giving concentration ratios as shown in Tables 3 and 4 below and the mixture was stirred at room temperature for 24 hours. These mixtures of course had a total polymer concentration of 0.4 wt % as in the solutions from which the mixtures were made. In order to obtain gel samples, the pH of these crosslinked guar solutions was increased by adding a few drops of aqueous NaOH (1.0 M) giving a pH of approximately 10.5 and the mixture was stirred vigorously at room temperature for 2 hours. Samples were stored at room temperature for approximately 12 hours prior to rheological measurements.

Tables 3 and 4 below list composition, mixing ratio and a maximum boron content for a number of compositions. The modified polymers are indicated by the designations used in Table 2 above. The maximum boron content is a concentration calculated on the basis that all the 3APBA reacted with the CMC. If some of the 3APBA did not react with the CMC and was subsequently removed during purification of the polymer, the actual boron content would be lower than this maximum value. Results given in Table 3 are storage (G') and loss (G") moduli at 25° C., 1 Hz oscillatory frequency and 10% strain. Table 4 contains viscosity measurements at 25° C. These Tables 3 and 4 include, for comparison, data for a gel containing 0.4 wt % guar and inorganic borate giving a boron concentration of 60 ppm.

TABLE 3 proportions and storage (G') and loss (G") moduli at 25° C., 1 Hz oscillatory frequency and 10% strain

| Designation | Modified polymer | Guar | Maximum boron | (G') | (G") |
|---|---|---|---|---|---|
| | | wt % | wt % | ppm | Pa | Pa |
| 14A-06 | 14A | 0.06 | 0.34 | 23 | 48 | 7 |
| 14A-10 | 14A | 0.1 | 0.3 | 38 | 46 | 8 |
| 14A-20 | 14A | 0.2 | 0.2 | 76 | 85 | 5 |
| 14A-30 | 14A | 0.3 | 0.1 | 114 | 45 | 4 |
| 14B-10 | 14B | 0.1 | 0.3 | 15 | 72 | 6 |
| 14B-20 | 14B | 0.2 | 0.2 | 30 | 88 | 6 |
| 14B-30 | 14B | 0.3 | 0.1 | 45 | 75 | 2 |
| 14B-34 | 14B | 0.34 | 0.06 | 51 | 35 | 3 |
| 14C-10 | 14C | 0.1 | 0.3 | 8 | 13 | 7 |
| 14C-20 | 14C | 0.2 | 0.2 | 16 | 36 | 7 |
| 14C-30 | 14C | 0.3 | 0.1 | 24 | 54 | 3 |
| 7C-10 | 7C | 0.1 | 0.3 | 8 | 18 | 4 |
| 7C-20 | 7C | 0.2 | 0.2 | 16 | 12 | 4 |
| 7C-30 | 7C | 0.3 | 0.1 | 24 | 11 | 2 |

TABLE 3-continued proportions and storage (G') and loss (G") moduli at 25° C.,
1 Hz oscillatory frequency and 10% strain

| Designation | Modified polymer | Guar wt % | Maximum boron ppm | (G') Pa | (G") Pa |
|---|---|---|---|---|---|
| | wt % | | | | |
| 7D-10 | 7D | 0.1 | 0.3 | 3 | 1 | 2 |
| 7D-20 | 7D | 0.2 | 0.2 | 5 | 2 | 2 |
| Borate | none | none | 0.4 | 60 | 11.1 | 0.5 |

In a few instances, the procedure was carried out more than once, thus giving an indication of repeatability. It was observed that values of G' and G" varied by about 5% between repeats.

TABLE 4 proportions and viscosities at 25° C.

| Designation | Mod... polymer wt % | Guar wt % | Max. boron ppm | Viscosity at 25° C. | | | | |
|---|---|---|---|---|---|---|---|---|
| | | | | 0.1 Hz | 1 Hz | 10 Hz | 25 Hz | 100 Hz |
| 14A-06 | 0.06 | 0.34 | 23 | 83.38 | 4.07 | 0.99 | 0.80 | 0.66 |
| 14A-10 | 0.1 | 0.3 | 38 | 308.20 | 10.87 | 5.24 | 3.08 | 1.08 |
| 14A-20 | 0.2 | 0.2 | 76 | 368.90 | 44.05 | 14.66 | 10.07 | 2.71 |
| 14A-30 | 0.3 | 0.1 | 114 | 115.20 | 20.67 | 5.24 | 3.62 | 2.04 |
| 14B-10 | 0.1 | 0.3 | 15 | 73.98 | 10.33 | 3.15 | 2.33 | 1.67 |
| 14B-20 | 0.2 | 0.2 | 30 | 244.50 | 37.41 | 10.53 | 6.19 | 2.61 |
| 14B-30 | 0.3 | 0.1 | 45 | 144.10 | 27.46 | 8.10 | 4.59 | 1.89 |
| 14B-34 | 0.34 | 0.06 | 51 | 70.15 | 14.40 | 4.21 | 2.32 | 0.94 |
| 14C-10 | 0.1 | 0.3 | 8 | 3.50 | 1.93 | 1.60 | 1.44 | 0.71 |
| 14C-20 | 0.2 | 0.2 | 16 | 391.90 | 34.70 | 12.19 | 6.82 | 2.53 |
| 14C-30 | 0.3 | 0.1 | 24 | 344.60 | 34.30 | 8.23 | 5.33 | 3.03 |
| 7C-10 | 0.1 | 0.3 | 8 | 10.23 | 8.25 | 3.65 | 2.74 | 1.33 |
| 7C-20 | 0.2 | 0.2 | 16 | 33.52 | 22.74 | 7.32 | 3.26 | 1.23 |
| 7C-30 | 0.3 | 0.1 | 24 | 21.65 | 3.40 | 1.57 | 0.94 | 0.46 |
| 7D-10 | 0.1 | 0.3 | 3 | 0.52 | 0.46 | 0.29 | 0.21 | 0.13 |
| 7D-20 | 0.2 | 0.2 | 5 | 0.88 | 0.43 | 0.42 | 0.29 | 0.20 |
| Borate | NA | 0.4 | 60 | 65.89 | 16.17 | 2.19 | 1.30 | 0.67 |

Viscosification with a reduced guar concentration has an advantage in the context of hydraulic fracturing. The fracturing fluid normally includes a so-called breaker which cleaves the guar after a period of time, assisting flow back to the surface at the end of the fracturing operation. However, the resulting residues of the mannose chain in guar after the break-up process may have poor solubility and remain below ground, potentially impeding flow from the subterranean formation.

Modification of polymer was also carried out with N-hydroxysuccinimide included in the reacting mixture. The experimental procedure was as follows: carboxymethyl cellulose which was either CMC 1400 or CMC 700 as in the table below (800.0 mg) was dissolved in deionized water (200 mL). In a separate container, 3APBA (93.0 mg, 0.6 mmol) was dissolved in a small amount of ethanol (0.5 mL). This solution was added dropwise, under continuous and vigorous stirring, to the polymer mixture solution. Then, EDC (115.0 mg, 0.6 mmol) and NHS (70.0 mg, 0.6 mmol) were added to the aqueous mixture, and the pH was adjusted to 5.5. After approximately 50 min, the pH was increased to 7.5 and kept at this value with the addition of diluted solutions of NaOH or HCl, if necessary. The reaction was left to proceed at room temperature for 2 days. The modified CMC was purified by dialysis (Spectrum dialysis membrane with a molecular weight cut off of 50 kDa) for 5-7 days in a dark environment at room temperature against deionized water (dialysate was exchanged on a regular basis). The pure polymer sample was isolated by freeze drying. Small scale tests showed that these polymers also yielded gels in the presence of guar at alkaline pH.

Example 1

A viscosified solution was prepared without separation of the modified polymer from the solution in which it was formed. The amide formation reaction was carried out in the presence of guar in accordance with the scheme shown in FIG. 5. The initial polymer was hydrolysed polyacrylamide (HPAM) which has free carboxylate groups as a result of the hydrolysis. The second compound was 3APBA and the coupling agent was EDC. The procedure was as follows: a mixture of HPAM120 (200.0 mg) and guar (600.0 mg) was dissolved in water (200.0 mL). The polymer mixture was acidified to pH approximately 5.2 by adding a few drops of HCl (1.0 M). Then, 3-aminophenyl boronic acid monohydrate (3APBA) (93.0 mg, 0.6 mmol) and EDC (115.0 mg, 0.6 mmol) were added to the polymer solution and the reacting mixture was stirred at room temperature for 14 hours After this time the pH of the polymer solution was increased to pH approximately 9.0, in order to induce gel formation, by adding a few drops of aqueous NaOH (1.0 M), and the mixture was stirred vigorously at room temperature for 2 hours. The final gel was stored at room temperature for approximately 5 hours prior to the rheological measurements.

Figure 9:
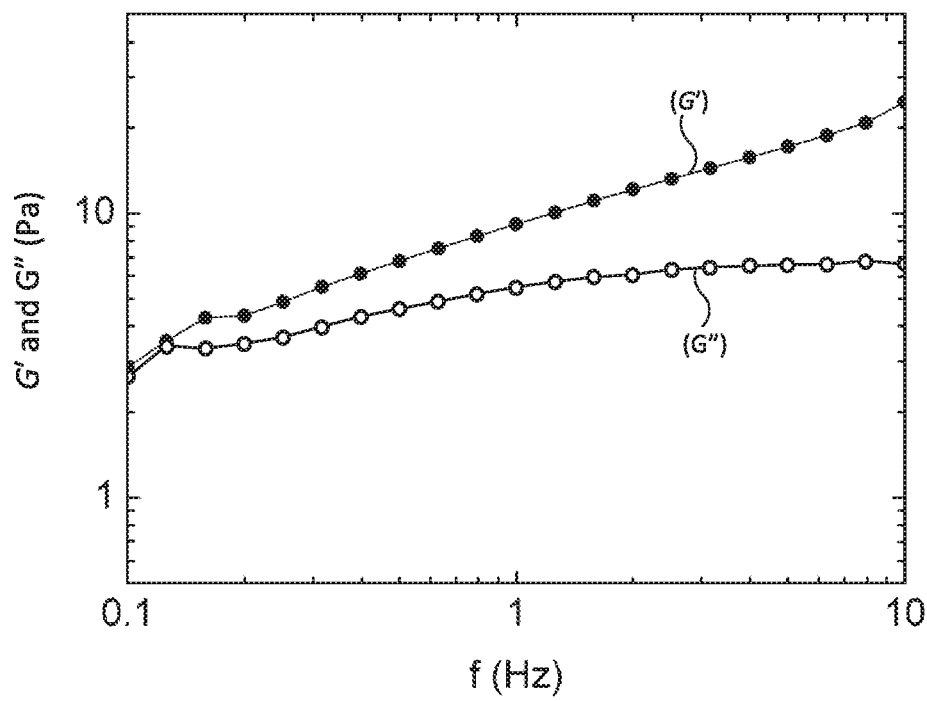
FIG. 9 is a graph of storage and loss moduli against frequency of oscillatory motion obtained in Example 1.

As shown by FIG. 9, an oscillatory frequency sweep measurement at 20° C. with strain of 10% showed storage modulus (G') above the loss modulus (G") over a frequency range from 0.2 Hz to 10 Hz. Values of apparent viscosity are given in the following Table 5.

TABLE 5

Viscosity (Pa · s)

| Shear rate | 1 Hz | 10 Hz | 25 Hz | 100 Hz |
|---|---|---|---|---|
| 25° C. | 1.762 | 0.716 | 0.451 | 0.240 |
| 80° C. | 0.122 | 0.100 | 0.081 | 0.046 |

Example 2

In this example the procedure was again in accordance with FIG. 5. The initial polymer was CMC. The second compound was used in an amount which was less than the stoichiometric amount to react with all the carboxylate groups on the CMC. The amount of EDC was in excess of the stoichiometric amount required for complete reaction. The reaction time was short.

Figure 10:
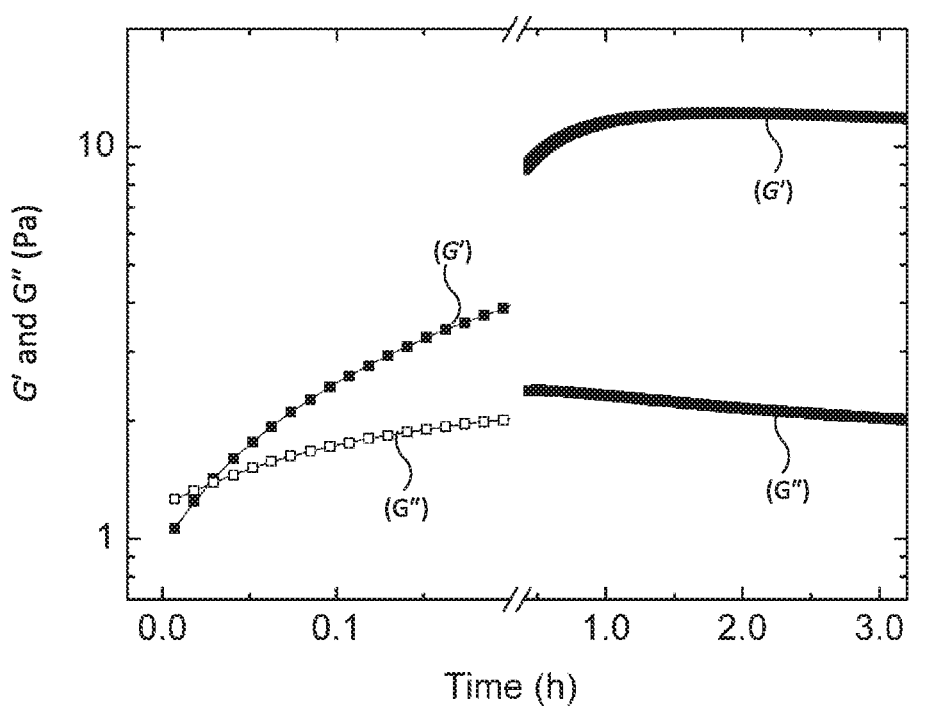
FIG. 10 is a graph of storage and loss moduli against time obtained in Example 2.

The procedure was as follows: a mixture of guar (400.0 mg) and CMC1400 (400.0 mg) was dissolved in MES buffer (200.0 mL, pH~5.7) using a Waring blender as mentioned previously. 2-aminophenylboronic acid hydrochloride (2APBA) (69.4 mg, 0.4 mmol) and EDC (191.7 mg, 1.0 mmol) were added to the polymer solution and the reacting mixture was stirred vigorously in the cup of the Waring blender at room temperature for 1 min. Then, the evolution of the rheological properties of the mixture was monitored for a period of three hours, to record the evolution of storage (G') and loss (G") moduli at 25° C. with constant frequency of 1 Hz, and strain of 3%. The results are shown in FIG. 10 where storage (G') and loss (G") modulus values during the first 10 minutes are shown with filled and open squares respectively. It can be seen that both moduli rose rapidly during this first 10 minutes and that after about 1.5 minutes the storage modulus (G') became greater than the loss modulus (G") which is indicative of gel formation. Both moduli became fairly constant after 1 hour when G' was about 10 Pa. The conclusion from these results is that cross-linking of guar began rapidly and was complete after about 1 hour.

Figure 11:
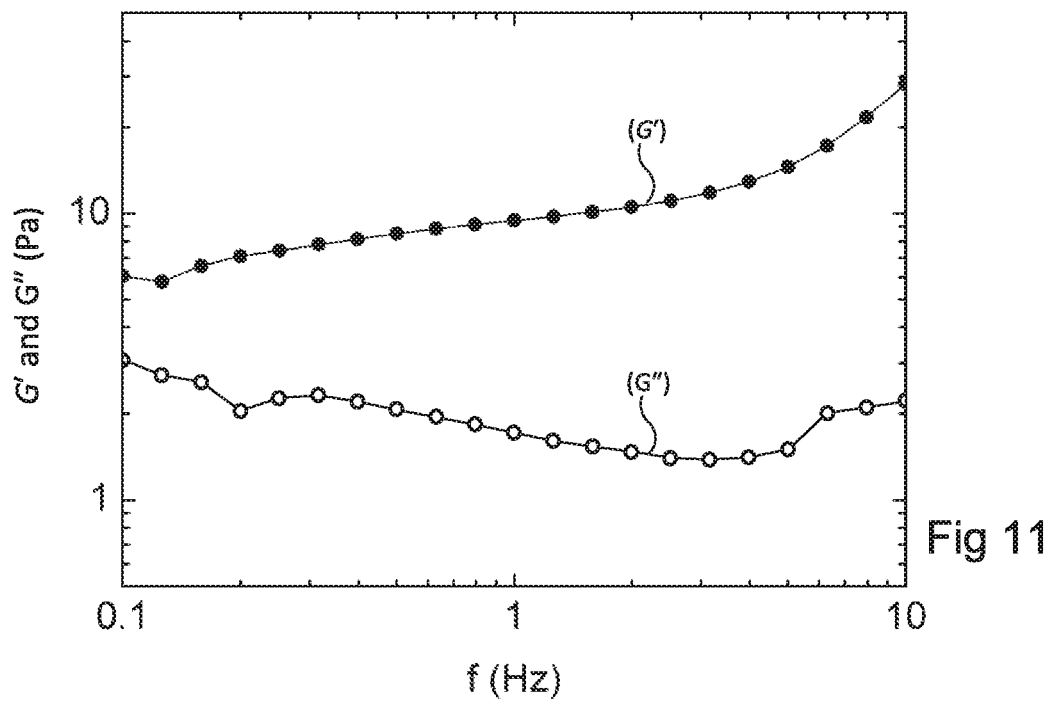
FIG. 11 is a graph of storage and loss moduli against frequency obtained in Example 2.

As shown by FIG. 11, an oscillatory frequency sweep measurement at 25° C. with strain of 3% showed storage modulus (G') above the loss modulus (G") over a frequency range from 0.1 Hz to 10 Hz. Values of apparent viscosity at 25° C. were 18.6 Pa s at 1 Hz, 3.3 Pa s at 10 Hz, 2.0 Pa s at 25 Hz, 0.8 Pa s at 100 Hz.

Example 3

In this example the procedure was in accordance with FIG. 6. The initial polymer was CMC. The second compound was 2APBA which leads to a modified polymer able to attach to diol groups under mildly acidic conditions. The initial polymer was first modified to introduce boronic acid groups, then modified again to introduce diol groups.

CMC1400 (800.0 mg) as the initial polymer was dissolved in MES buffer (200.0 mL, pH approximately 5.7). The calculated stoichiometric quantity of 2APBA to react with all the carboxy groups on the CMC was 3.1 mmole as in the preliminary experiments. KCl (4.0 g, 53.7 mmol), 2-aminophenylboronic acid hydrochloride (2APBA) (69.4 mg, 0.4 mmol) and EDC (95.8 mg, 0.5 mmol) were added to the polymer solution. The final mixture was stirred for 1 h at room temperature and the rheology of a sample of this solution was examined with an oscillatory frequency sweep at 25° C. with 10% strain at decreasing oscillatory frequency to determine storage (G') and loss (G") moduli over the range of oscillatory frequency.

After this time, 4-aminobenzene-1,2-diol hydrobromide (4AD, 82.4 mg, 0.4 mmol) and EDC (95.8 mg, 0.5 mmol) were added to the mixture so as to bring about further modification of the polymer. Stirring was continued at room temperature for 10 min. Finally, stirring was stopped and the mixture was stored at room temperature for 14 hours in the measuring cup of a rheometer before any rheological characterization was performed (all rheological tests were completed between 14 and 72 hours from sample preparation). The rheology of this gel containing the doubly-modified carboxymethyl cellulose was examined in the same way as before.

Figure 12:
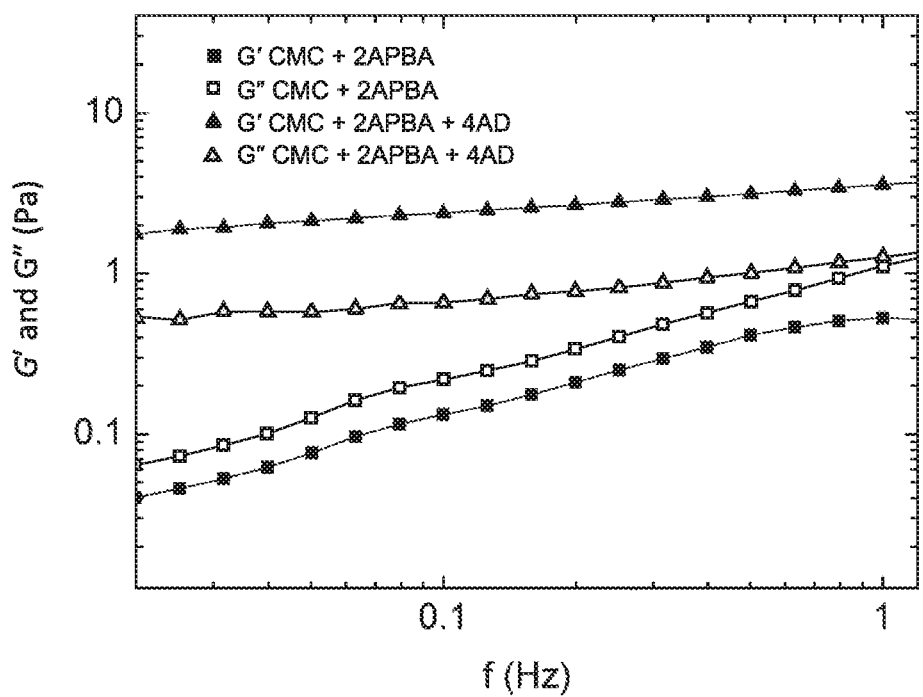
FIG. 12 is a graph of storage and loss moduli against frequency obtained in Example 3.

FIG. 12 shows the values of storage (G') and loss (G") moduli at 25° C. for the solutions before and after the further modification using 4AD. Values of these moduli before and after the further modification are shown with squares and triangles respectively and the values of loss (G") modulus are shown with open symbols. It can be seen that after the further modification the storage (G') modulus exceeded the loss (G") moduli, which is evidence of cross-linking between polymer chains.

Example 4

This example shows a procedure in accordance with FIG. 7 in which functional groups introduced by formation of amide groups are able to react with each other and bring about cross-linking. These functional groups were thiol groups which are able to combine to form disulfide groups which serve as cross-links.

CMC1400 (800.0 mg) was dissolved in water (200.0 mL). This polymer solution was acidified to pH ca. 5.2 by adding a few drops of HCl (1.0 M). Then, 4-aminothiophenol (4ATP, 125.2 mg, 1.0 mmol) and EDC (306.7 mg, 1.6 mmol) were added to the acidic CMC1400 solution and the reaction mixture was stirred for 1 hour (during this time, the pH of the mixture rose to ca. 8.3). Then, KCl (4.0 g, 53.7 mmol) was added and the mixture was stirred for further 5 hours Finally, the modified polymer solution was acidified to pH 6.5, in order to induce gelation, and stirred vigorously at room temperature for 1 hour. At this pH the thiol groups combined to form disulphide cross-links. It was assumed that dissolved atmospheric oxygen provided the required oxidizing agent. The final gel was stored at room temperature for ca. 5 hours prior to the rheological examination. An oscillatory frequency sweep measurement at 25° C. with strain of 10% showed storage modulus (G') above the loss modulus (G") over a frequency range from 0.3 Hz to 10 Hz. The value of G' was 20 Pa over this range of frequency.

The calculated stoichiometric quantity of 4ATP to react with all the carboxy groups on the CMC was 3.1 mmole. It can thus be seen that 4ATP was used in an amount which was about one third of the amount needed for reaction of all carboxylic acid groups on the CMC.

Example 5

This example demonstrates a procedure akin to that shown in FIG. 8. The initial polymer was CMC. The second compound contained four polyethylene glycol chains each terminating in an amino group. It had the following structure and a mean molecular weight of 5000 Daltons.

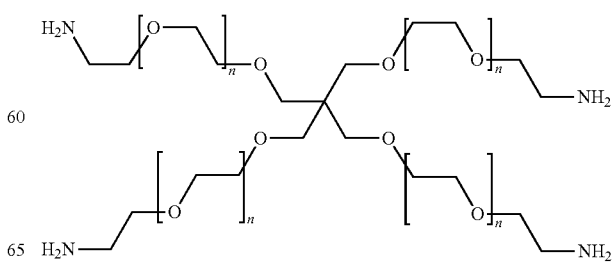

This compound has a pentaerythritol residue at its centre, and may be referred to as 4-arm-PEG-amine.

Figure 13:
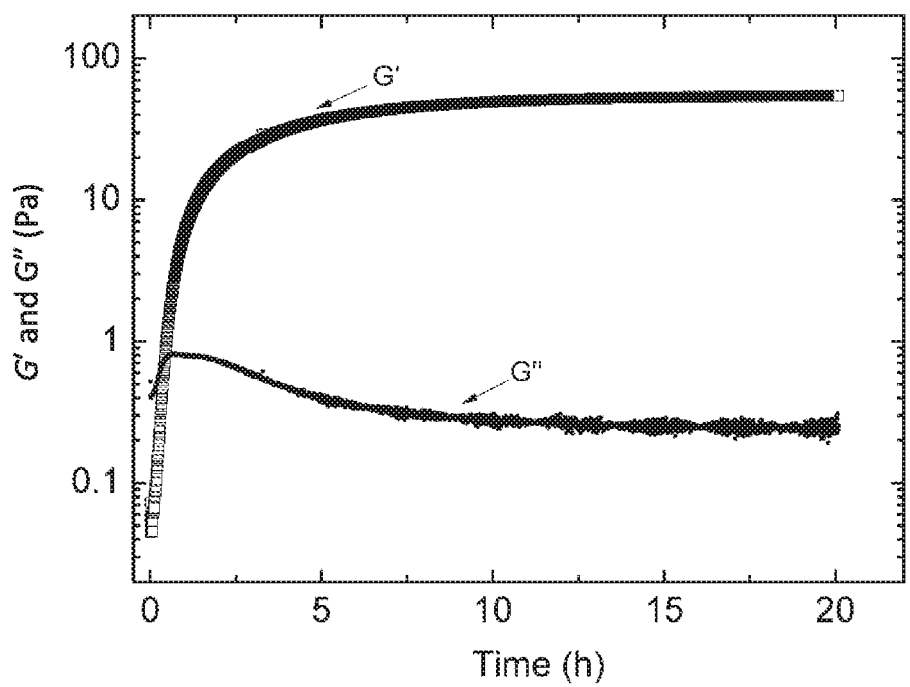
FIG. 13 is a graph of storage and loss moduli against time obtained in Example 5.

Reaction of the CMC and this aminoPEG led to cross-linking of the CMC. The coupling agent was the triazine compound 4-(4,6-dimethoxy-1,3,5-triazin-2-yl)-4-methyl-morpholinium chloride (DMTMM). Quantities and procedure were as follows: CMC1400 (104.0 mg) and amino-PEG (104.0 mg) were dissolved in phosphate buffer (26.0 mL) pH about 7.0. In a separate container, DMTMM (150.0 mg, 0.5 mmol) was dissolved in a small amount of buffer (0.5 mL). This solution was added dropwise, under continuous and vigorous stirring to the polymer mixture solution. Stirring was continued for an additional 5 min. After this time, the values of storage (G') and loss (G") moduli were monitored for a period of about 20 hours, thereby monitoring the progress of the cross-linking. As shown by FIG. 13 the storage modulus rose rapidly in the first 2 hours and the crosslinking was completed after approximately 10 hours.

Figure 14:
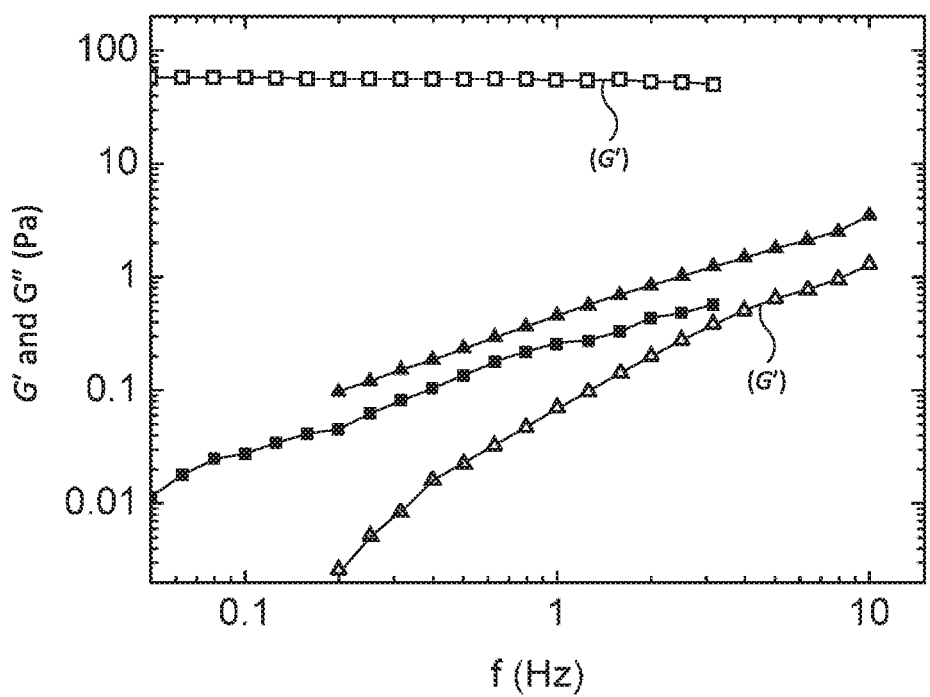
FIG. 14 is a graph of storage and loss moduli against frequency obtained in Example 5.

Rheological testing of the gel was then carried out within 24 hours from the beginning of the reaction. FIG. 14 shows results of oscillatory frequency tests at 25 C and 1% strain on the mixture of CMC and amino PEG before the reaction (data points are triangles) and on the gel produced by the reaction (data points are squares). Values of storage and loss moduli are shown with open and closed symbols respectively. Before reaction the storage modulus (G') was less than the loss (G") modulus, consistent with the liquid state of the mixture, but after reaction storage modulus was much higher than the loss modulus, consistent with the formation of a crosslinked gel. Viscosities at 25° C. and 80° C. were

TABLE 6

| Viscosity (Pa · s) | | | | |
|---|---|---|---|---|
| Shear rate | 1 Hz | 10 Hz | 25 Hz | 100 Hz |
| 25° C. | 20.85 | 5.25 | 3.15 | 1.31 |
| 80° C. | 12.69 | 3.00 | 1.82 | 0.94 |

Example 6 Reaction with Alkylanilines

This example also followed the procedure shown in FIG. 7. However, cross-linking was not a result of chemical bond formation but instead resulted from association of hydrophobic groups in the polar environment provided by the aqueous solution. The initial polymer is again carboxymethyl cellulose. Three preparations were carried out. In each of them the second compound was a 4-alkyl substituted aniline. Three alkyl chain lengths were used: ethyl, hexyl and octyl.

CMC1400 (800.0 mg) was dissolved in MES buffer (200.0 mL, pH~5.7) giving a solution containing the polymer at a concentration of 0.4 wt %. It was calculated that the stoichiometric quantity of alkylaniline to react with all the carboxy groups on the CMC would be 3.1 mmole. In this example, 0.7 mmole of alkylaniline was used to react with CMC, which would only be enough to react with 23% of the carboxy groups on the CMC, even if all of the alkyl aniline reacted with CMC. This amount of alkylaniline was dissolved in ethanol (5.0 mL) in a separate container. This solution in ethanol was added dropwise, under continuous and vigorous stirring to the CMC1400 solution. Stirring was continued for an additional 5-10 min. Then, EDC (134.2 mg, 0.7 mmol) was dissolved in MES buffer (5.0 mL) and added dropwise to the reaction mixture over a period of 2 minutes under continuous stirring. Stirring was continued for an additional 2 minutes. After this time, stirring was stopped and the final gel was stored at room temperature for approximately 5 hours prior to examination of rheological properties. An oscillatory frequency sweep at 25° C. with 10% strain was used to determine storage (G') and loss (G") moduli over the range of oscillatory frequency.

Figure 15:
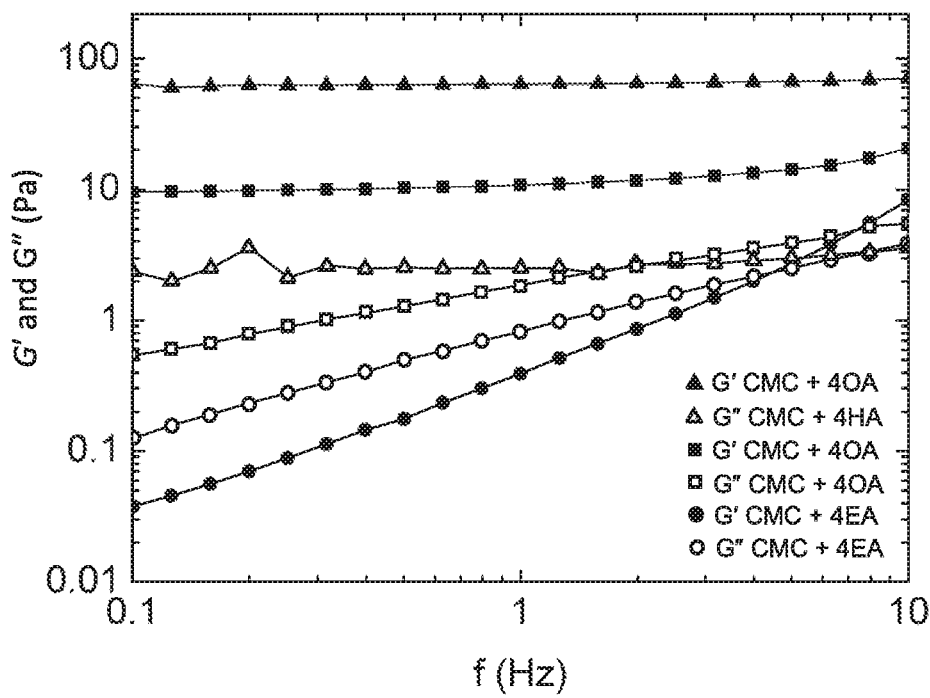
FIG. 15 shows graphs of storage and loss moduli against frequency for three products obtained in Example 6.

FIG. 15 shows the values of storage (G') and loss (G") moduli after modification with 4EA (circles), 4HA (triangles) and 4OA (squares). Open symbols are used for the loss moduli. The fluid formed using 4EA was a viscous fluid, whereas the 4HA fluid is a solid-like hydrogel (G' is higher than G" for the whole range of oscillatory frequencies). This effect can be attributed to the lower lipophilicity of ethylphenyl groups from 4EA in comparison hexylphenyl groups from 4HA, which means that hexylphenyl groups which are residues of 4HA can establish stronger and/or longer lasting intermolecular interactions after attachment to the CMC backbone. In contrast, 4OA, which is more lipophilic than 4HA, produces a weaker gel than 4HA (although stronger than the 4EA fluid). It was assumed that only a limited amount of 4OA is solubilized in the aqueous carboxymethylcellulose solution before reaction, with the consequence that the extent of modification of the initial polymer is less than with 4HA and so the number of potential crosslinks that can be established in the 4OA fluid is small in comparison to the 4HA fluid.

Figure 16:
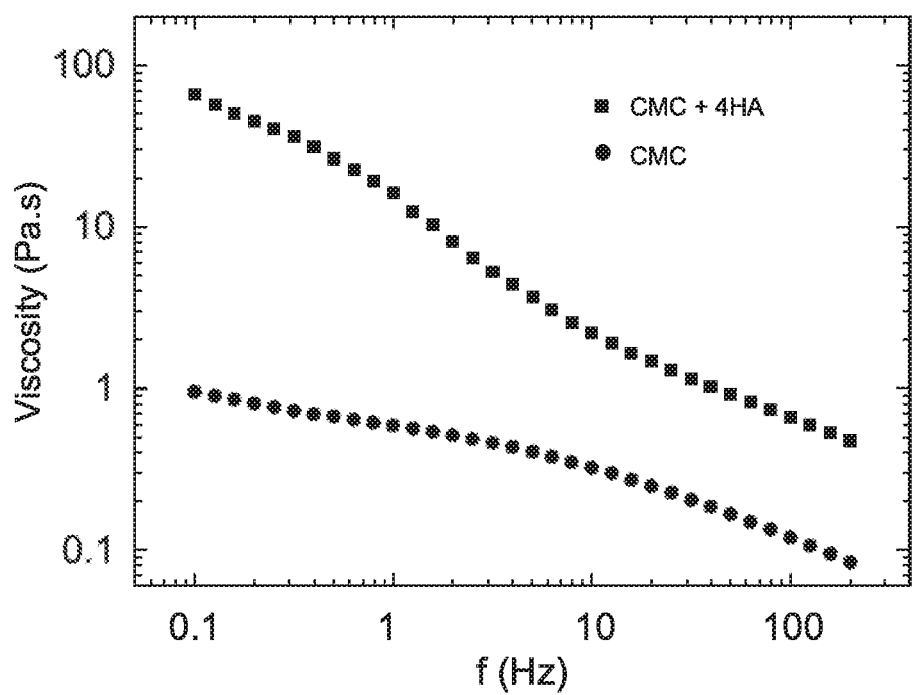
FIG. 16 shows graphs of viscosity against shear rate before and after reaction of 4-hexylaniline in Example 6.

FIG. 16 shows viscosities of the CMC1400 solution before reaction (circles) and of the fluid formed from it by modification of the CMC with 4HA (squares). The greater viscosity after reaction is clearly apparent.

Example 7

Preparation as in the previous example was repeated using CMC1400, CMC 700 and CMC 250 at to provide three molecular weights of carboxymethylcellulose and using 4-hexyl aniline (4HA) in varying amounts. For each preparation the amount of CMC was 800 mg in 200 ml buffer, which is 0.4 wt %. The calculated stoichiometric amount of 4HA to react with all carboxylate groups in this quantity of CMC would be 3.1 mmole. 4HA was used in ten amounts shown in Table 7 below giving concentrations in the 200 mL buffer solution as stated. EDC was used in amounts which were equimolar with respect to 4HA.

TABLE 7

| Amounts and concentrations of 4—hexylaniline used in this example | | | |
|---|---|---|---|
| Amount (mmole) | Concentration (wt %) | Amount (mmole) | Concentration (wt %) |
| 0.11 | 0.0095 | 0.91 | 0.080 |
| 0.23 | 0.020 | 1.17 | 0.10 |
| 0.36 | 0.032 | 1.53 | 0.14 |
| 0.51 | 0.046 | 2.07 | 0.18 |
| 0.69 | 0.061 | 3.14 | 0.28 |

It will be appreciated that these amounts of hexylaniline (4HA) were less than or equal to the calculated stoichiometric amount for reaction of all carboxylic acid groups of the CMC.

Figure 17:
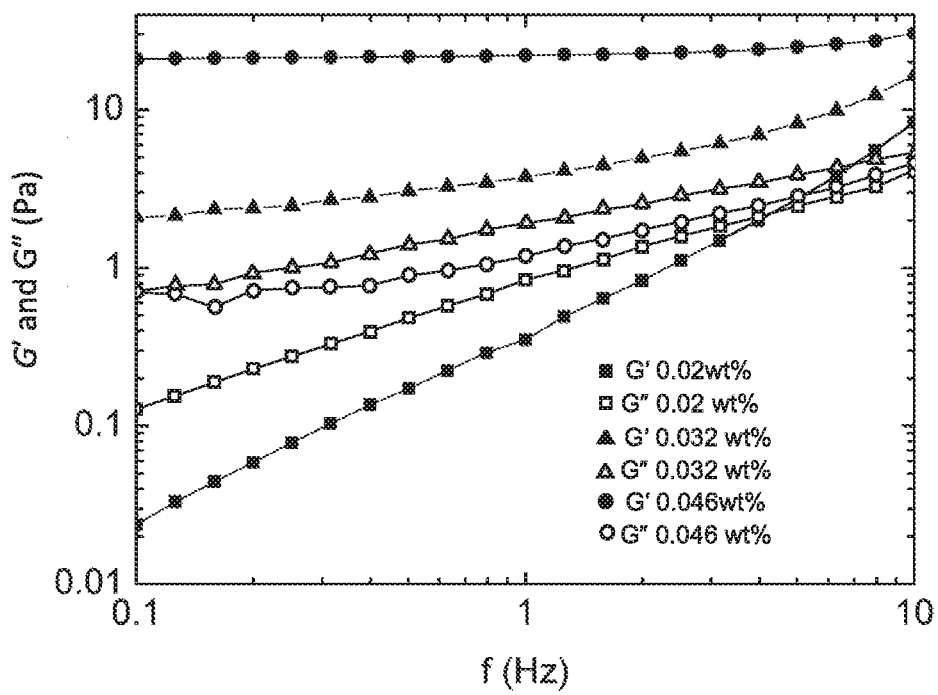
FIG. 17 shows graphs of storage and loss moduli against frequency for three compositions obtained in Example 7.

FIG. 17 shows measured values of storage (G') and loss (G") moduli at a range of frequencies for CMC1400 reacted with three of the above concentrations of 4HA which were 0.020, 0.032 and 0.046 wt % (shown with squares, triangles and circles respectively). As in previous figures, filled and open symbols are used for the storage and loss moduli respectively. It can be seen that the reaction using only 0.020 wt % HA led to insufficient cross-linking and hence a fluid composition with the loss modulus greater than the storage modulus over most of the oscillatory frequency range. By contrast the compositions made using 0.032 and 0.046 wt % HA led to gels with storage modulus (G') exceeding the loss modulus (G") over the range of frequencies.

Figure 18:
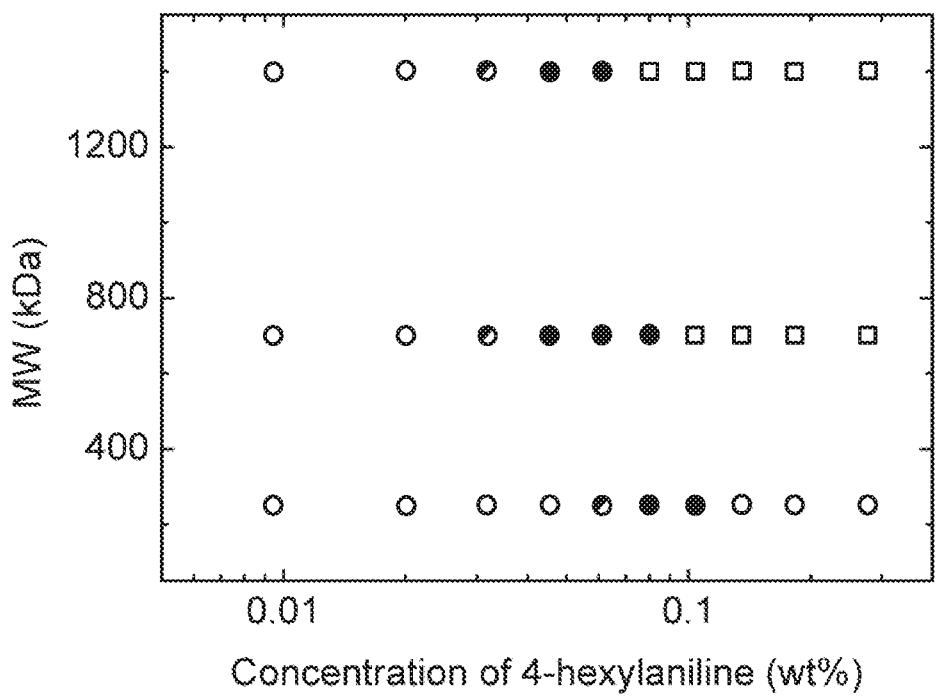
FIG. 18 summarises the nature of gels obtained in Example 7.

For all the preparations in this example, the results of oscillatory frequency sweeps to measure storage (G') and loss (G") moduli are summarized in FIG. 18 where solutions which were liquids are indicated with open circles. Gel-like systems (G'>G") at all the investigated frequencies) are indicated by filled circles if storage modulus G'>10 Pa at 1 Hz and by half-filled circles if G'<10 Pa at 1 Hz. It was observed that higher concentrations of 4HA led to solutions which undergo phase separation (syneresis) upon standing: these are indicated with open squares.

A number of measurements of viscosity at 1, 10, 25 and 100 Hz at 25° C. and values of storage (G') and loss (G") moduli at 1 Hz, at 20° C. and 3% strain are listed in the following Table 8. Viscosities at 80° C. then follow in Table 9.

TABLE 8

| Initial polymer | 4HA | G' | G" | Viscosity at 25° C. | | | |
|---|---|---|---|---|---|---|---|
| (0.4 wt %) | (wt %) | (Pa) | (Pa) | 1 Hz | 10 Hz | 25 Hz | 100 Hz |
| CMC1400 | 0.020 | 0.35 | 0.84 | Not measured | | | |
| CMC1400 | 0.032 | 3.76 | 1.92 | 2.31 | 0.49 | 0.29 | 0.14 |
| CMC1400 | 0.046 | 22.06 | 1.18 | 13.69 | 1.71 | 0.87 | 0.36 |
| CMC1400 | 0.061 | 64.14 | 2.58 | 14.13 | 3.05 | 1.89 | 0.97 |
| CMC700 | 0.020 | | | Not measured | | | |
| CMC700 | 0.032 | 1.88 | 1.09 | Not measured | | | |
| CMC700 | 0.046 | 11.50 | 0.96 | 8.34 | 1.00 | 0.50 | 0.22 |
| CMC700 | 0.061 | 30.35 | 1.07 | 14.03 | 1.79 | 0.91 | 0.38 |
| CMC700 | 0.080 | 42.95 | 1.66 | 11.00 | 1.72 | 0.94 | 0.42 |
| CMC250 | 0.061 | 3.36 | 0.48 | 3.03 | 0.38 | 0.19 | 0.08 |
| CMC250 | 0.080 | 14.79 | 0.59 | 7.36 | 1.04 | 0.53 | 0.22 |
| CMC250 | 0.104 | 19.02 | 1.33 | 8.55 | 1.26 | 0.61 | 0.25 |

TABLE 9

Viscosities at 80° C.

| Initial polymer | 4HA | Viscosity at 80° C. | | | |
|---|---|---|---|---|---|
| (0.4 wt %) | (wt %) | 1 Hz | 10 Hz | 25 Hz | 100 Hz |
| CMC1400 | 0.032 | 0.07 | 0.03 | 0.03 | 0.02 |
| CMC1400 | 0.0465 | 9.85 | 1.13 | 0.47 | 0.16 |
| CMC1400 | 0.061 | 11.94 | 2.13 | 1.25 | 0.63 |
| CMC700 | 0.0465 | 6.39 | 0.70 | 0.30 | 0.11 |
| CMC700 | 0.061 | 10.94 | 1.24 | 0.57 | 0.21 |
| CMC700 | 0.080 | 6.99 | 0.94 | 0.49 | 0.21 |

Example 8 Comparison with Inorganic Borate Cross-Linking

Properties of a gel made with 800 mg (0.4 wt %) CMC 1400 and 0.69 mmole (0.06 wt %) hexylaniline (4HA) and 0.69 mmole EDC, as in Examples 6 and 7 above were investigated further and compared to properties of 0.4 wt % guar cross-linked with inorganic borate (60 ppm boron) at pH 10 as was also used as a comparison in the preliminary experiments above.

Figure 19:
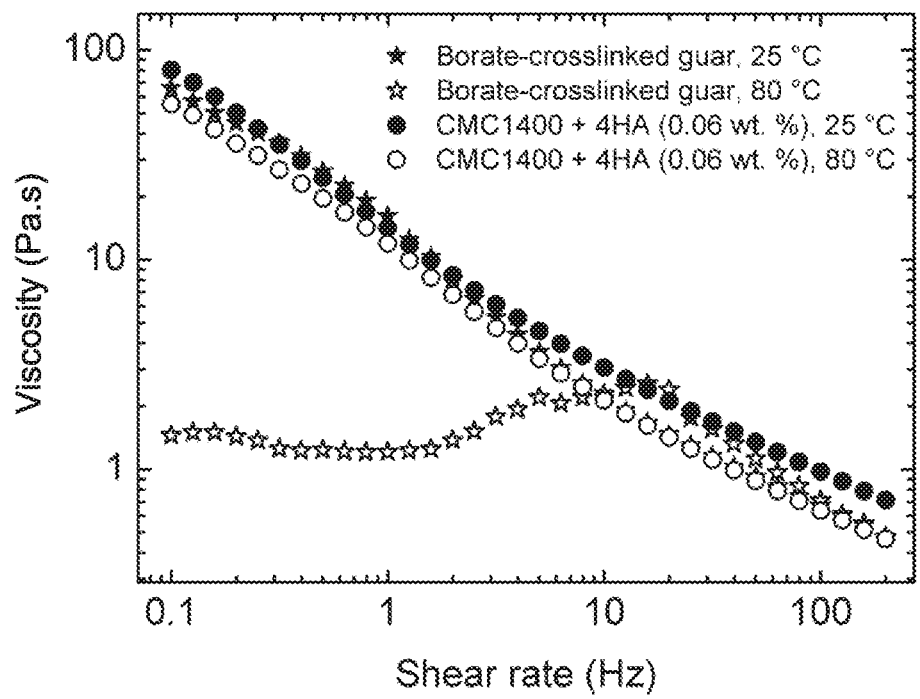
FIG. 19 shows viscosity plotted against shear rate for a composition of Examples 6 and 7 and a comparative composition at two temperatures.

FIG. 19 is a plot of viscosity against shear rate for the above gel formed with CMC and 4HA (circles) and the comparative borate crosslinked guar (stars). Values at 25° C. are shown with filled symbols and at 80° C. with open symbols. It can be seen that the gel formed with CMC and 4HA had similar viscosity to the comparative cross-linked guar at 25° C. and retained much of this viscosity at 80° C. over the whole range of shear rates. By contrast under low shear (shear rates<5 Hz) the guar cross-linked with inorganic borate did not retain its viscosity at 80° C.

It was observed that the gel formed with CMC and 4HA exhibited shear-recovery analogous to that with guar-borate gels, attributable to cross-linking through transient intermolecular association of hydrophobic groups. The CMC and 4HA gel was subjected to step-strain measurements, in which a large-magnitude oscillatory strain (600%) was applied and then immediately followed by a small-magnitude strain (3%). The large-magnitude strain ruptured the hydrogel structure, while the small-magnitude strain allows for the recovery of the material properties (self-healing). It was observed that the gel properties recovered, within a short time after the network rupture by the large strain. The storage and loss moduli returned to steady values in less than 200 seconds. These reversible solid-liquid transitions could be repeated a number of times without loss of the shear recovery property.

Figure 20:
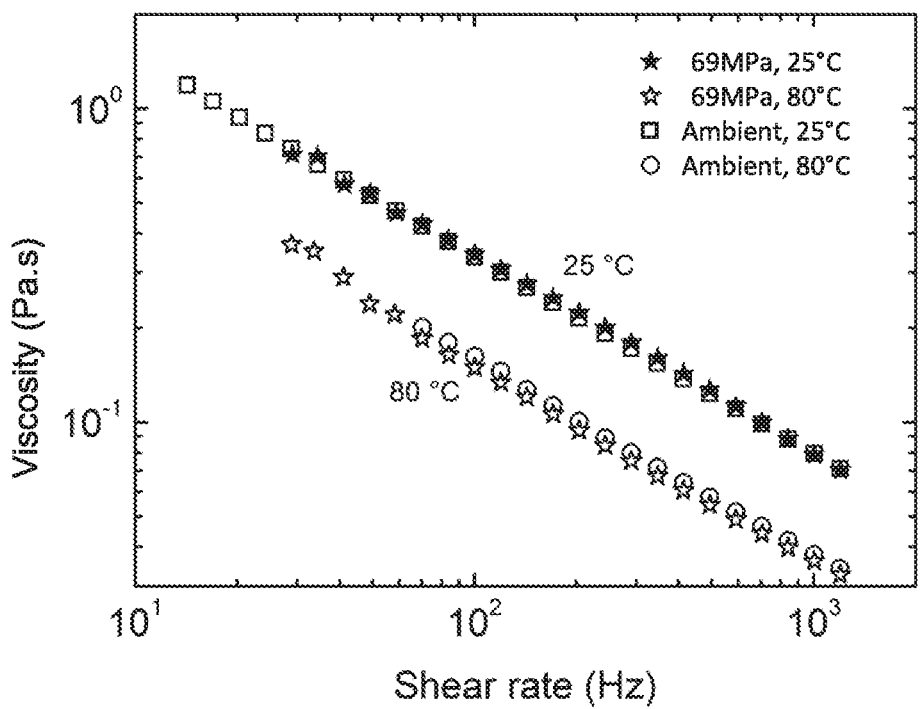
FIG. 20 shows viscosity plotted against shear rate for a composition of Examples 6 and 7 as in FIG. 19 at two temperatures and at two pressures.

It was also observed that the gel formed from CMC1400 and 4HA retained its viscosity under pressure, whereas it has been reported by Parris et al Macromolecules vol 41 pp 8181-86 (2008) that borate cross-linked guar loses viscosity under pressure. The viscosity of a sample of this gel formed from CMC1400 and 4HA was measured at 25° C. and 80° C. both at ambient pressure and also under a pressure of 69 MPa (10,000 psi). The resulting graphs are shown as FIG. 20. The upper line is data points at 25° C. shown with open squares for ambient pressure and filled stars for 69 MPa. The lower line is data points at 80° C. are shown with open circles for ambient pressure and open stars for 69 MPa pressure. It can be seen that for each temperature, the data points at the two pressures are almost superimposed, showing that viscosity is almost insensitive to pressure.

Figure 21:
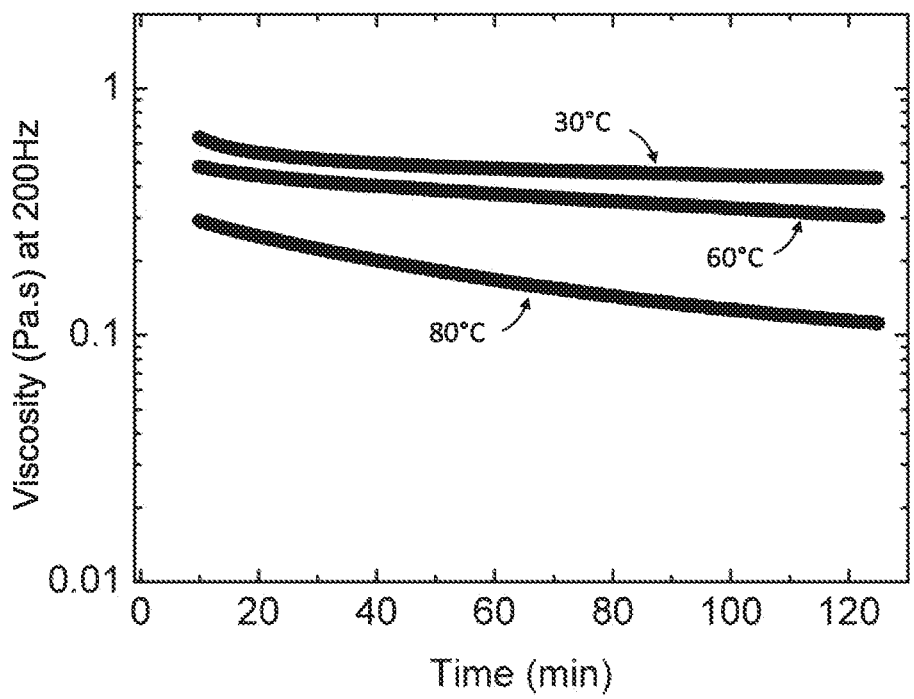
FIG. 21 shows viscosity plotted against time while a composition of Examples 6 and 7 as in FIG. 19 is maintained under pressure, at each of three temperatures.

In another experiment, samples of the same gel composition were maintained under pressure of 69 MPa and temperatures of 30° C., 60° C. and 80° C. for periods of two hours while monitoring viscosity. The viscosities at a shear rate of 200 Hz are plotted against time in FIG. 21 and it can be seen that even at 80° C. the viscosity remained above 0.1 Pa·s for two hours.

Example 9

This example demonstrated the ability of a composition made as in Example 7 to suspend sand. A composition was made, as in Example 7, using 0.4 wt % solution of CMC1400 as the initial polymer and 0.025 wt % 4HA intended as a low concentration to give a relatively small amount of modification of the CMC and consequently a relatively small amount of cross-linking. A comparative composition was again made using 0.4 wt % guar cross-linked with boric acid in an amount providing 60 ppm boron in the composition. The comparative composition was adjusted to pH 10 so that the borate cross-linked the guar.

Figure 22:
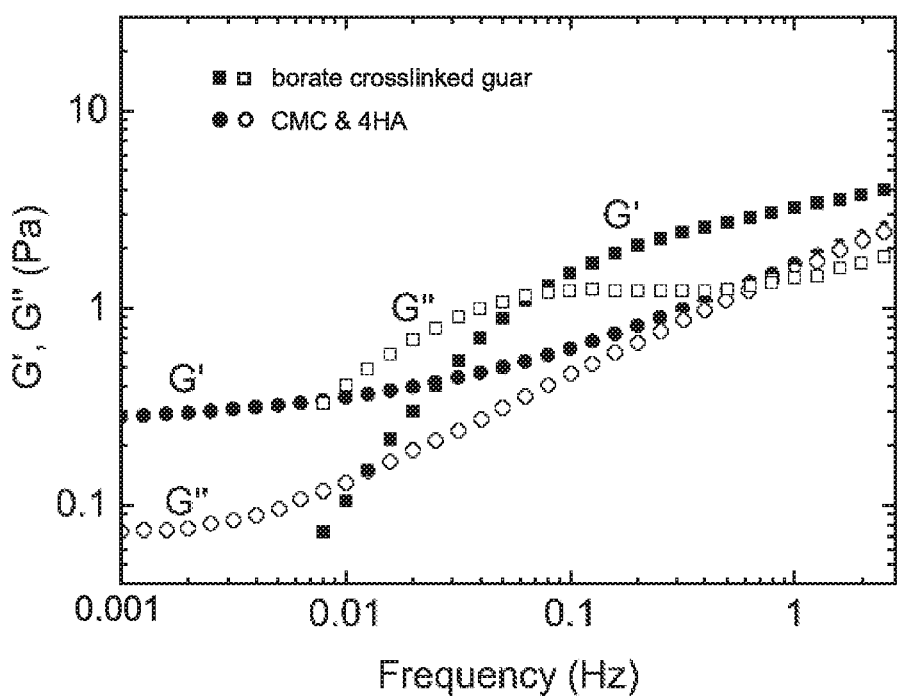
FIG. 22 shows graphs of storage and loss moduli against frequency for the composition and comparative composition used in Example 8.
Figure 23:
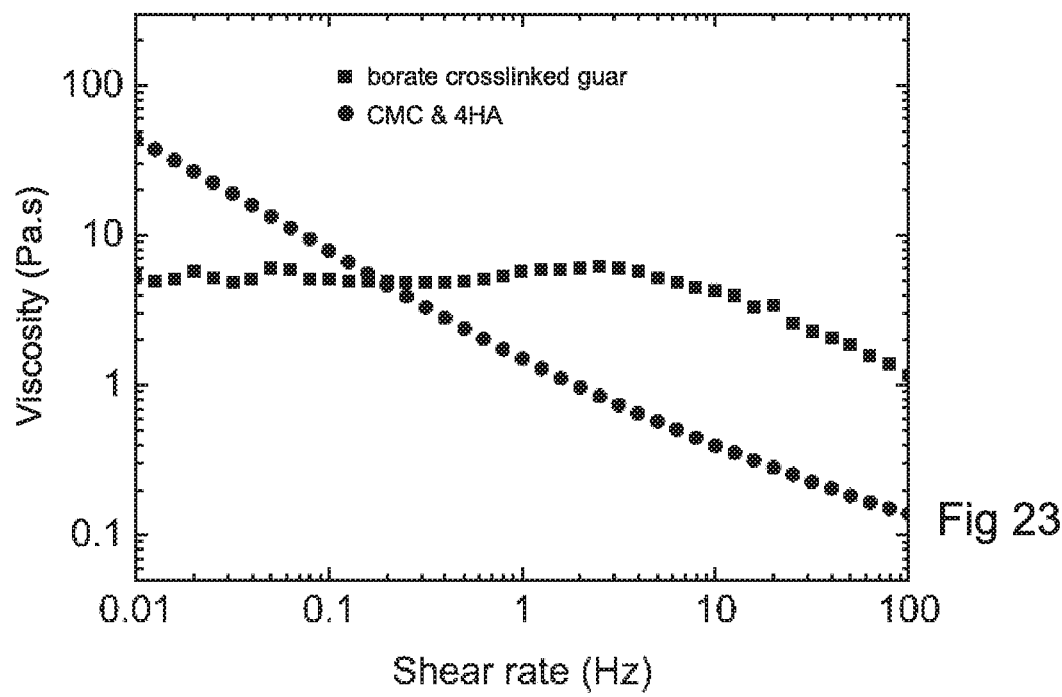
FIG. 23 shows graphs of viscosity against shear rate for the composition and comparative composition used in Example 9.

Rheological examination of both compositions was measurement of viscosity and also an oscillatory sweep test to measure storage modulus (G') and loss modulus (G") over the range of oscillatory frequencies and measurement of viscosity at a range of shear rates. Results are shown in FIGS. 22 and 23, in which the data points for the composition containing CMC modified with 4HA are shown by circles and the points for guar cross-linked with borate are squares. In FIG. 22 the data points for storage and loss moduli are shown with filled and open symbols respectively.

As shown by FIG. 23, the composition containing modified CMC has high viscosity at low shear rates, whereas the guar composition has approximately constant and low viscosity at shear rates of 1 Hz and below. For both compositions, G' and G" are dependent on oscillatory frequency; with decreasing G' values at lower frequencies as shown in FIG. 22. In the case of the guar fluid, G' is higher than G" above a specific frequency of about 0.08 Hz. Below this value of oscillatory frequency G" dominates. In contrast to the guar fluid, G' values corresponding to the CMC1400 fluids are higher than those of G" at all frequencies up to 1 Hz.

20/40 sand (which is commonly used as a proppant in hydraulic fracturing) was mixed with both fluids to produce homogeneous slurries with a sand to fluid ratio of 2:3. The slurries were transferred to individual measuring cylinders and settling of the sand was monitored by photographing these cylinders periodically. The sand settling process was completed within 1 hour in the borate-crosslinked guar fluid whereas in the composition containing modified CMC, settling continued for 24 hours. The appearance of the cylinder containing modified CMC fluid after 4 hours showed no more settling than in the guar fluid after 30 minutes. We believe that the delayed sedimentation in the modified CMC1400 fluid, in comparison to the guar fluid, can be attributed to the much higher apparent viscosity when shear is very low.

Example 10

In this example, preparation as in Example 6 was carried out using 4-aminobenzoic acid (4ABZ) as the second compound. The coupling agent can bring about attachment of the amino group of this second compound to a carboxylic acid group on the initial polymer, but can also bring about reaction of the amino group of one 4ABZ molecule with the carboxylic acid group of another 4ABZ molecule. Consequently this reaction lead led to formation of a modified polymer containing amidobenzoic acid derived groups, some of which would be a dimer or oligomer of 4ABZ attached to the initial CMC.

Figure 24:
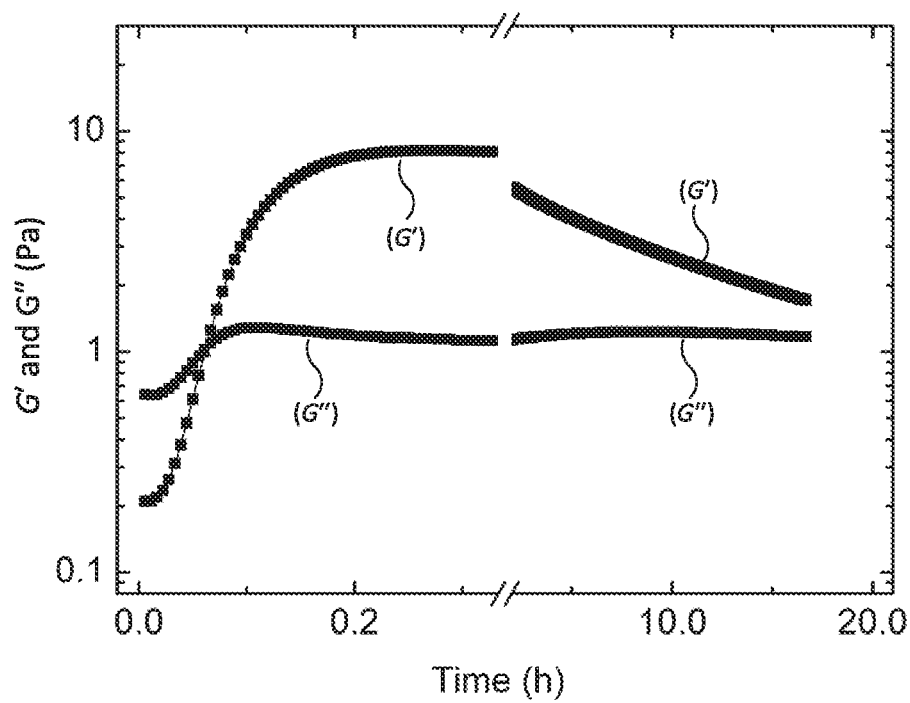
FIG. 24 is a graph of storage and loss moduli against time obtained in Example 10.

CMC1400 (800.0 mg) was dissolved in MES buffer (200.0 mL, pH~5.7) giving a solution containing the polymer at a concentration of 0.4 wt %. As previously mentioned, the stoichiometric quantity of a second compound with one amino group to react with all the carboxy groups on the CMC would be 3.1 mmole. In this example, 233.1 mg (1.7 mmole) of 4ABZ and 498.4 mg (2.6 mmole) of EDC were added to the buffered CMC solution while stirring vigorously at room temperature. Stirring was continued for one minute. Stirring was continued for one minute. Evolution of rheological properties was monitored over a period of 17 hours. The results are shown in FIG. 24 which is a plot of storage modulus (G") and loss modulus (G) at 25° C. with 1 Hz oscillatory frequency and 3% strain.

It can be seen that there was an initial increase in storage modulus over a short time (approximately 10 minutes) attributable to cross-linking of the hydrophobic rings of the amidobenzoic acid derived moieties in the modified polymer. However, after about 10 hours the cross-linking declined, attributed to further reaction involving the amidobenzoic acid derived moieties.

Such degradability of the viscosifying material can be useful in the context of hydraulic fracturing of a subterranean formation where the viscosified aqueous fluid is eventually required to flow back to the surface. This degradability could be provided by using a second compound in which a hydrophobic group is part of an ester moiety which undergoes slow hydrolysis. An example of such a second molecule is an ester of amino benzoic acid having the structure

where R is an aliphatic group of 3 to 6 carbons atoms, for instance butyl or hexyl.

Example 11

Preparation as in Examples 6 and 7 was carried out using carboxymethyl hydroxypropyl guar (CMHPG) as the initial polymer. Quantities and procedure were as follows: CMHPG (800.0 mg) was dissolved in MES buffer (200.0 mL, pH approximately 5.7). In a separate container, 4HA (106.4 mg, 0.6 mmol) was dissolved in ethanol (5.0 mL). This solution was added dropwise, under continuous and vigorous stirring to the CMHPG solution. Stirring was continued for an additional 5-10 min. Then, EDC (134.2 mg, 0.7 mmol) was dissolved in MES buffer (5.0 mL) and added dropwise to the reaction mixture over a period of 2 min under continuous stirring. Stirring was continued for an additional 2 min. After this time, stirring was stopped and the final gel was stored at room temperature in the measuring cup of a rheometer for ca. 5 hours prior to the rheological examination.

Figure 25:
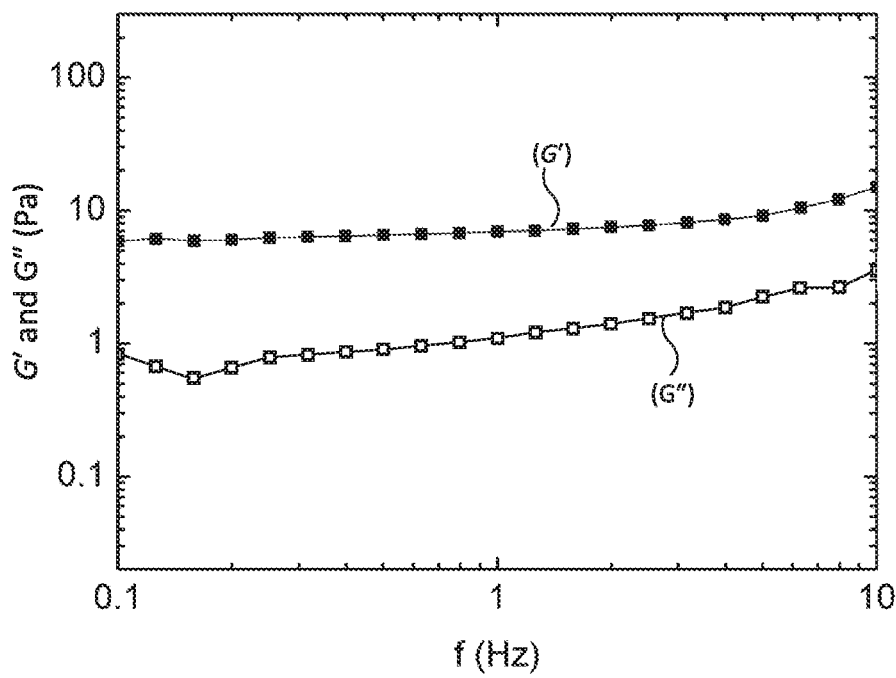
FIG. 25 is a graph of storage and loss moduli against frequency obtained in Example 11.

FIG. 25 shows measured values of storage (G') and loss (G") moduli at a range of oscillatory frequencies. It can be seen that the gel had storage modulus (G') exceeding the loss modulus (G") over the whole range of frequencies from 0.1 Hz to 10 Hz. Viscosities at 25° C. and 80° C. are given in the following Table 10:

TABLE 10

| Shear rate | Viscosity (Pa · s) | | | |
| --- | --- | --- | --- | --- |
| | 1 Hz | 10 Hz | 25 Hz | 100 Hz |
| 25° C. | 4.74 | 0.65 | 0.34 | 0.16 |
| 80° C. | 2.98 | 0.56 | 0.25 | 0.09 |

Example 12

Preparation similar to that in Examples 6 and 7 was carried out using hydrolysed polyacrylamide as the initial polymer. As previously mentioned, this has carboxylate functional groups as a result of the hydrolysis. A different coupling agent was used. This was the triazine compound 4-(4,6-dimethoxy-1,3,5-triazin-2-yl)-4-methylmorpholinium chloride (DMTMM).

Quantities and procedure were as follows: HPAM200 (400.0 mg) was dissolved in water (200.0 mL). In a separate container, 4HA (106.3 mg, 0.6 mmol) was dissolved in ethanol (5.0 mL). This solution was added dropwise, under continuous and vigorous stirring to the HPAM solution. Stirring was continued for an additional 1 hour. Then, DMTMM (193.7 mg, 0.7 mmol) was dissolved in water (5.0 mL) and added dropwise to the reaction mixture over a period of 10 min under continuous stirring. Stirring was continued for an additional 1 hour. After this time, stirring was stopped and the final gel was stored at room temperature for approximately 14 h prior to the rheological examination.

Figure 26:
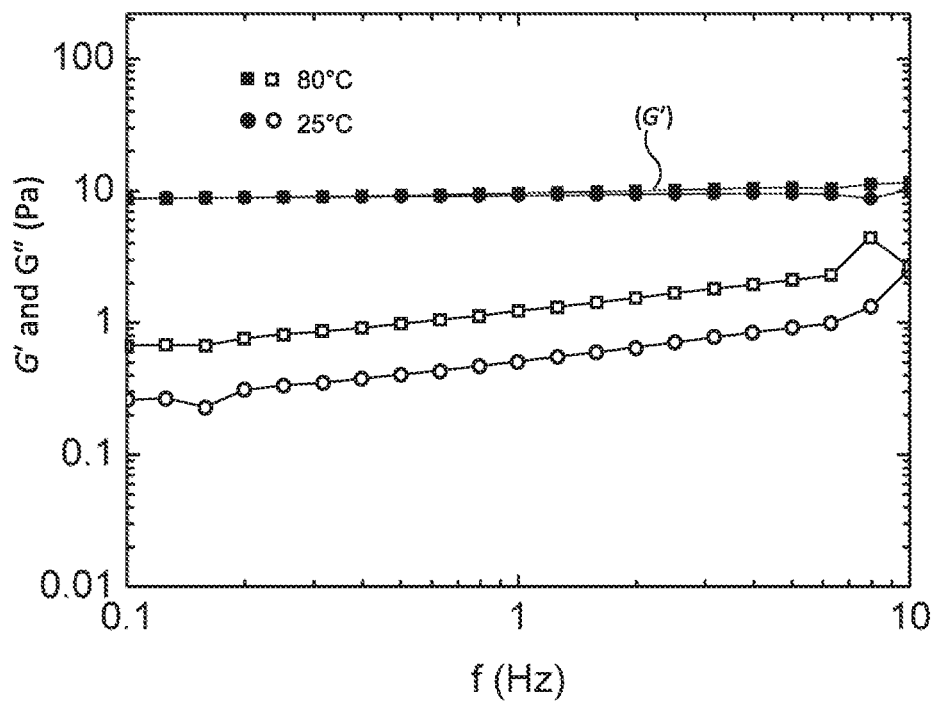
FIG. 26 is a graph of storage and loss moduli against frequency obtained in Example 12.

FIG. 26 shows measured values of storage (G') and loss (G") moduli at a range of frequencies using 5% strain, at both 25° C. (circles) and 80° C. (squares). It can be seen that the gel had storage modulus (G') shown with filled symbols, exceeding the loss modulus (G") over the range of frequencies and that the values of storage modulus were approximately the same at both temperatures. Viscosities at these temperature are given in Table 11:

TABLE 11

| Shear rate | Viscosity (Pa · s) | | | |
|---|---|---|---|---|
| | 1 Hz | 10 Hz | 25 Hz | 100 Hz |
| 25° C. | 11.89 | 2.37 | 1.21 | 0.52 |
| 80° C. | 5.38 | 1.13 | 0.56 | 0.24 |

Example 13

In this example hydrophobic modification of carboxymethylcellulose as in Examples 6 and 7 was carried out in the presence of 2.0 wt. % of KCl. The viscoelastic surfactant VES1 was then added to the resulting solution of modified CMC.

Quantities and procedure were: CMC1400 (800.0 mg) was dissolved in MES buffer (200.0 mL, pH approximately 5.7). Once the polymer was completely hydrated, KCl (4.0 g, 53.7 mmol) was added. In a separate container, 4HA (35.5 mg, 0.2 mmol) was dissolved in ethanol (5.0 mL). This solution was added dropwise, under continuous and vigorous stirring to the CMC solution. This gives a concentration of less than 0.02 wt % 4HA in the aqueous solution. Stirring was continued for an additional 5-10 min. Then, EDC (57.5 mg, 0.3 mmol) was dissolved in MES buffer (5.0 mL) and added dropwise to the reaction mixture over a period of 2 min under continuous stirring. Stirring was continued for an additional 20 min. After this time, VES1 (the final concentration of surfactant in the mixture was 2 wt. %) was added dropwise to the reacting mixture over a period of 20 min under continuous stirring. Finally, stirring was stopped and the mixture was stored at room temperature for 14 hours before rheological examination.

Figure 27:
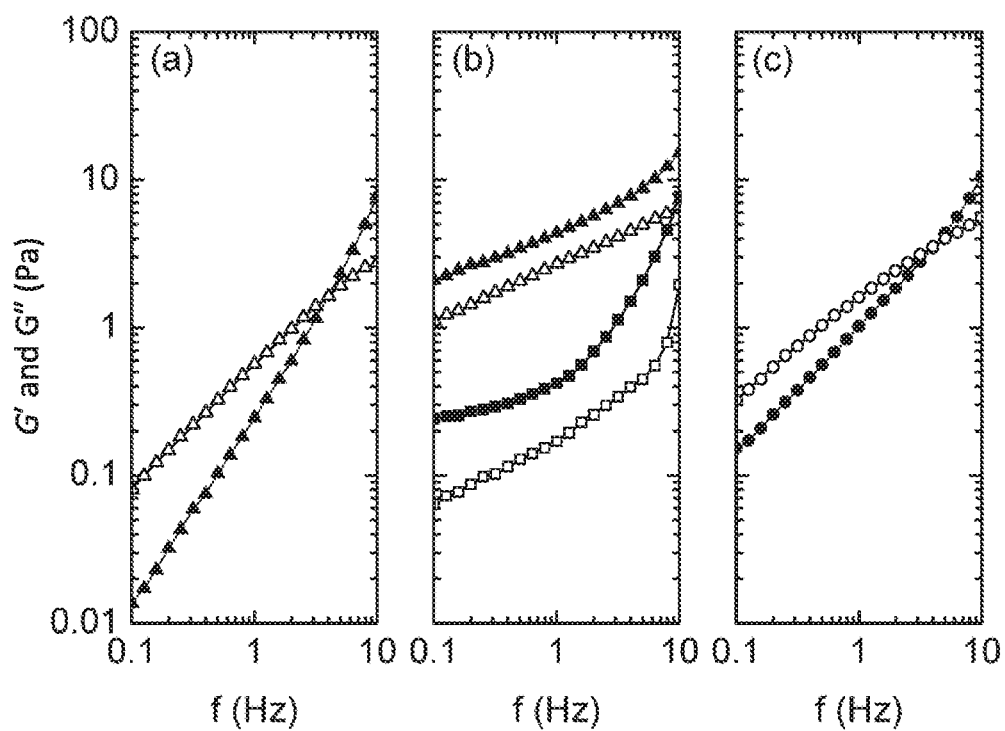
FIG. 27 shows a number of graphs of storage and loss moduli against frequency relating to Example 13.

FIG. 27 shows the results of oscillatory frequency sweep measurements of storage modulus (G' shown with filled symbols) and loss modulus (G" shown with open symbols) for the composition prepared above and for some comparative compositions. Graph (a) at the left shows measurements for a composition prepared as above, but omitting the viscoelastic surfactant. For much of the range of oscillatory frequency the storage modulus (G') was lower than the loss modulus and the composition was a viscous fluid (this is consistent with Example 7 in which 0.02 wt % of 4HA was insufficient to provide a gel). Box (b) in the centre shows results for a 2 wt % solution of VES alone (squares) and for the composition prepared above (triangles). It can be seen that the composition prepared above was a gel, having storage modulus (G') greater than its loss modulus, and that these moduli were greater than the moduli for the VES alone. The graph (c) at the right is for a comparative solution of CMC, 4HA, VES1 and KCl in the quantities above but without the coupling agent. That mixture was a viscous liquid. These results show that the modified CMC bearing hydrophobic hexylphenyl groups is forming cross-links with the surfactant and increasing the gel strength.

Example 14

A number of operations carried out in a subterranean well make use of a saline solution or a brine which has been deliberately weighted with dissolved salts. We have found that aqueous solutions can be viscosified with hydrophobically modified polymers when dissolved salt is present and in some instances a gel is only formed in the presence of dissolved salt.

This example used a phenylboronic acid, but it followed the procedure shown in FIG. 7, and utilized the somewhat lipophilic character of a phenylboronic acid group, such that cross-linking resulted from association of hydrophobic groups in the polar environment provided by the aqueous solution. Once again the initial polymer was CMC1400.

Two preparations were carried out. CMC1400 (800.0 mg) was dissolved in MES buffer (200.0 mL, pH approximately 5.7). For one preparation, KCl (4.0 g, 53.7 mmol) was added to the solution of CMC and the mixture was stirred for 30 min. KCl was not added to the other preparation. Next 2APBA (138.7 mg, 0.8 mmole) and EDC (191.7 mg, 1 mmole) were added to the solution containing CMC and the solution was stirred for 20 min at room temperature. After this time, stirring was stopped and the mixture was stored for 14 hours Rheological examination was then carried out during the period between 14 and 24 hours from sample preparation).

Figure 28:
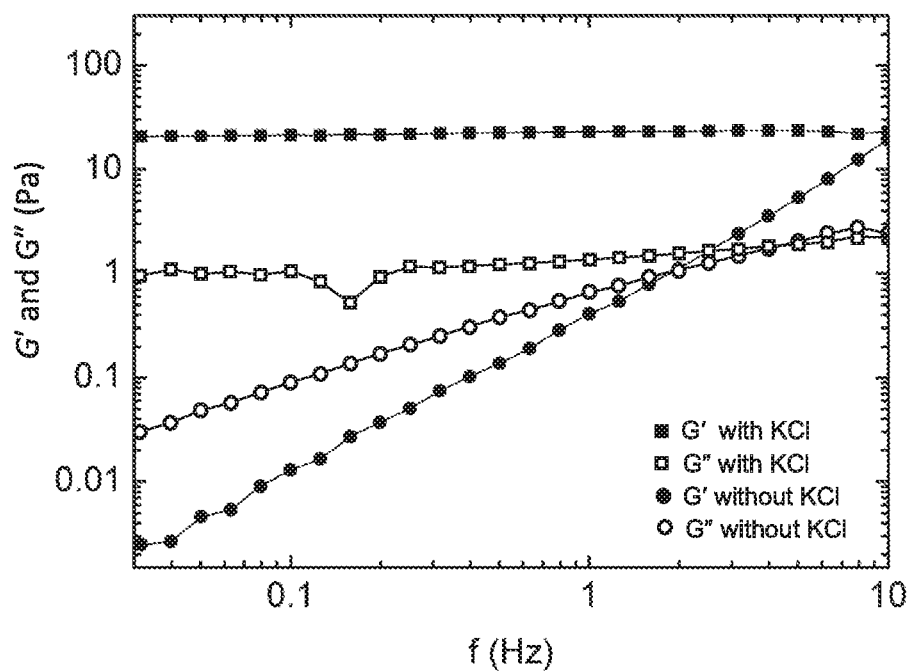
FIG. 28 shows graphs of storage and loss moduli against frequency for the composition prepared in Example 14, with and without potassium chloride in solution.

FIG. 28 uses circles for results in the absence of KCl and squares for results with KCl present. Storage and loss moduli are shown with filled and open symbols. In the absence of KCl, the mixture was a viscous liquid, with loss modulus greater than storage modulus over much of the oscillatory frequency range. When KCl was present the storage modulus was constant, and greater than the loss modulus over the whole range of oscillatory frequency. Viscosity was also very much greater in the presence of KCl. Some viscosity values are in the following Table 12:

TABLE 12

| | Viscosity (Pa · s) | | | |
|---|---|---|---|---|
| | 1 Hz | 10 Hz | 25 Hz | 100 Hz |
| 2wt % KCl at 25° C. | 21.86 | 6.48 | 3.78 | 1.80 |
| 2wt % KCl at 80° C. | 2.61 | 0.72 | 0.63 | 0.56 |
| without KCl at 25° C. | 0.14 | 0.11 | 0.09 | 0.05 |

Example 15

Gels were prepared from heavy brines. In one preparation CMC1400 (1.0 g) and NaCl (52.0 g, 889.8 mmole) were dissolved in MES buffer (147.0 mL, pH approximately 5.7) using a Waring blender. Next 2APBA (220.0 mg, 1.3 mmole) and EDC (442.2 mg, 2.3 mmole) were added to the solution containing CMC and the solution was stirred for 20 min at room temperature. After this time, stirring was stopped and the mixture was stored for 48 hours prior to any rheological measurement.

A second preparation was similar, but used potassium chloride. CMC1400 (1.2 g) and KCl (48.0 g, 643.9 mmole) were dissolved in MES buffer (151.0 mL, pH approximately 5.7). Next 2APBA (86.7 mg, 0.5 mmole) and EDC (172.5 mg, 0.9 mmole) were added to the solution containing CMC and the solution was stirred for 20 min at room temperature. After this time, stirring was stopped and the mixture was stored for 48 hours prior to any rheological measurement.

The concentrations of materials in solution and the specific gravity of the solutions are summarized in Table 13 below:

TABLE 13

| Specific gravity | KCl (wt. %) | NaCl (wt. %) | CMC1400 (wt. %) | 2APBA (wt. %) | EDC (wt. %) |
|---|---|---|---|---|---|
| 1.20 | — | 26 | 0.5 | 0.11 | 0.22 |
| 1.16 | 24 | — | 0.6 | 0.04 | 0.09 |

As an example, viscosity values for the fluid containing KCl (24.0 wt. %) and NaCl (26.0 wt. %) are given in the following Table 14:

TABLE 14

| | Viscosity (Pa · s) | | | |
|---|---|---|---|---|
| | 1 Hz | 10 Hz | 25 Hz | 100 Hz |
| 24.0 wt % KCl at 25° C. | 10.63 | 2.62 | 1.36 | 0.57 |
| 24.0 wt % KCl at 80° C. | 3.72 | 1.32 | 0.82 | 0.39 |
| 26.0 wt % NaCl at 25° C. | 20.95 | 4.98 | 6.40 | 2.89 |
| 26.0 wt % NaCl at 80° C. | 3.97 | 2.17 | 1.74 | 0.89 |

These values of viscosity were higher than the viscosities called for in a commercial gravel packing system.

Figure 29:
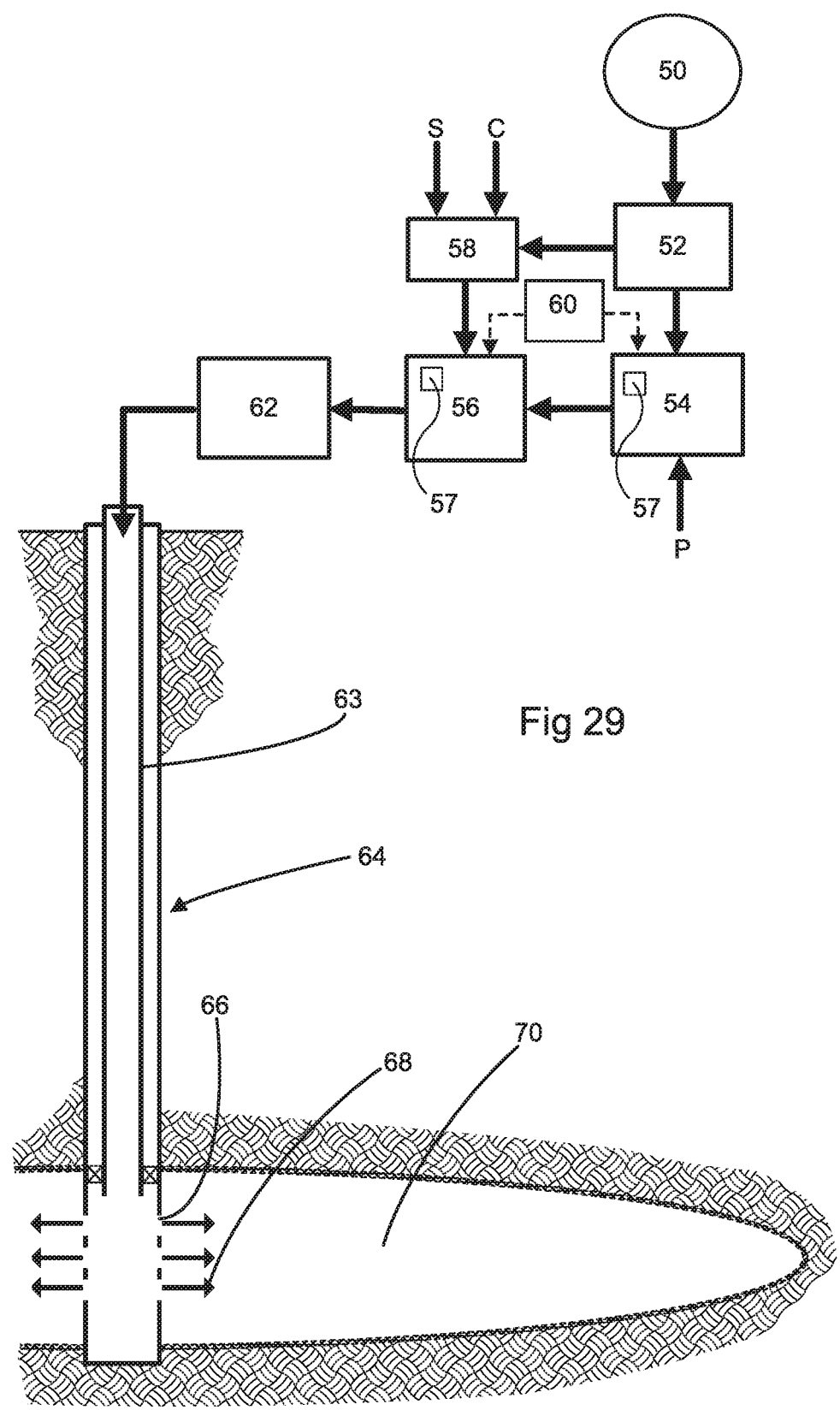
FIGS. 29 and 30 schematically illustrate application of embodiments of the present method to provide viscosified fluid for use in hydraulic fracturing.

To illustrate and exemplify use of some embodiments of the method of this invention, FIG. 29 shows diagrammatically the arrangement when a fracturing job is carried out. Water from a supply 50 is delivered by a pump 52 to a mixer 54 where initial polymer (arrow P) is mixed with the water. The resulting polymer solution flows into a vessel 56. Water from the supply pump 52 is also delivered to a second mixer 58 where the second compound and coupling agent (arrows S and C) are dissolved in the water. The resulting solution goes at once into the vessel 56 where the initial polymer is modified by reaction with the second compound and coupling agent. Sensors 57 monitors pH and controls the addition of dilute acid or other pH adjusting agent from a supply 60. The mixture of materials flows out of vessel 56 to pumps 62 which pump the mixture under pressure down the production tubing 63 of a wellbore 64. The mixture flows through perforations 66 into a fracture 68 in the reservoir formation as indicated by the arrows 70 at the foot of the well. The supply 50, mixers 54, 58, pumps 52, 62 and vessel 56 are connected one to the next by pipework and thus there is a surface flowpath from the supply into the well in which tubing 62 defines an underground flowpath continuing from the surface flowpath.

Figure 30:
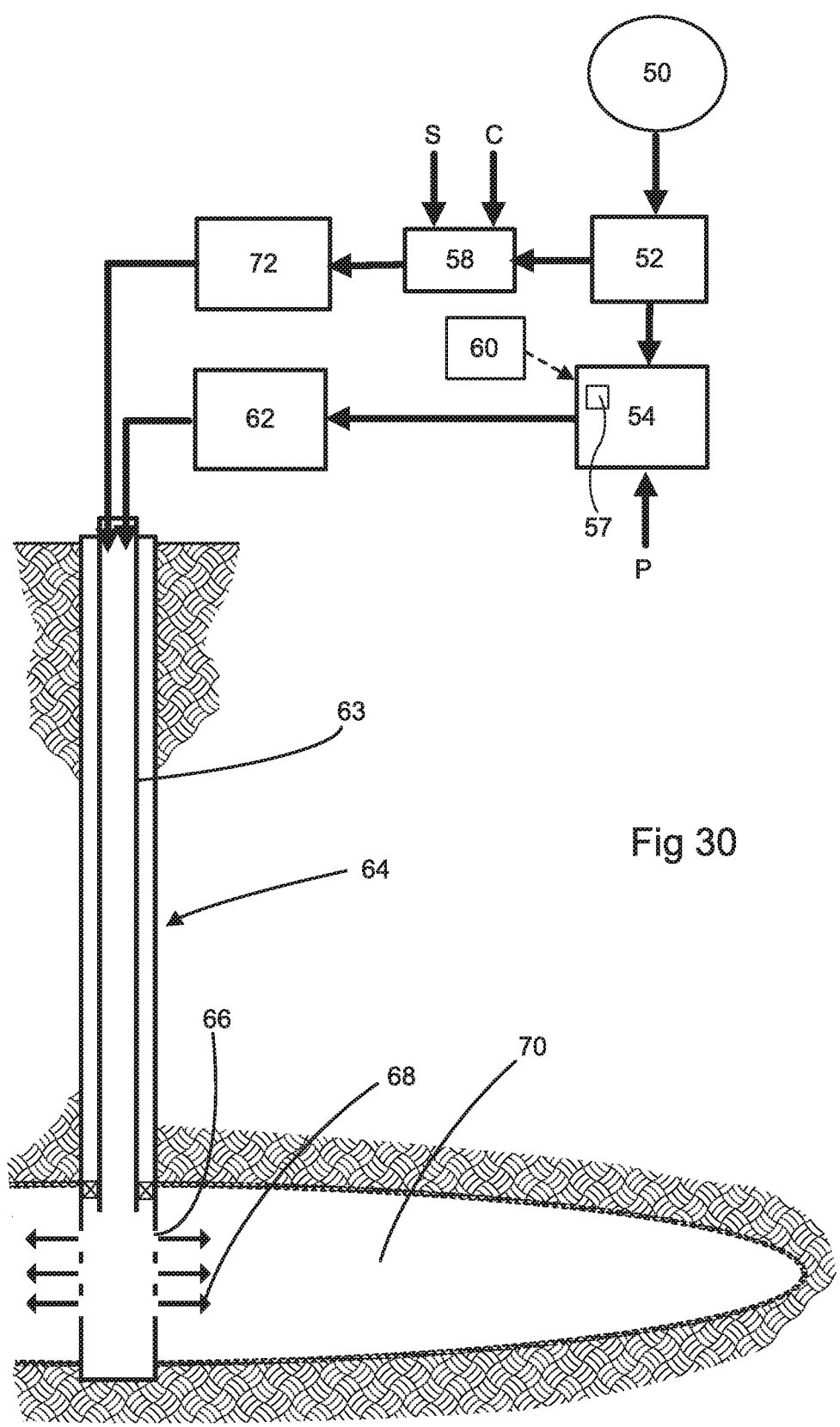

FIG. 30 shows a variation on this arrangement. The solution of initial polymer flows from the mixer 52 directly to the pumps 62 which deliver it under pressure into the production tubing 63. The solution of second compound and coupling agent flows from the mixer 58 to pumps 72 which deliver it as a separate flow into the production tubing 63, so that the initial polymer mixes with the second compound and coupling agent within the production tubing, and the reaction which modifies the polymer takes place within the well.

It will be appreciated that the embodiments and examples described in detail above can be modified and varied within the scope of the concepts which they exemplify. Proportions may be varied and may not be as shown in the drawings which are schematic and intended to explain layout and function of the embodiments. Features referred to above or shown in individual embodiments above may be used together in any combination as well as those which have been shown and described specifically. More particularly, where features were mentioned above in combinations, details of a feature used in one combination may be used in another combination where the same feature is mentioned. Accordingly, all such modifications are intended to be included within the scope of this disclosure as defined in the following claims.

What is claimed is:

1. A method of making a viscosified aqueous solution, the method comprising:
   contacting in aqueous solution:
      an initial polymer which includes a polymer chain with functional groups distributed along the polymer chain, the functional groups being either carboxylic acid or amino groups;
      a second compound including at least one functional group which is either an amino group or carboxylic acid group, the second compound functional group being the other type of functional group compared to the initial polymer functional group, wherein the second compound also includes at least one hydrophobic group; and
      a coupling agent, wherein the coupling agent is a carbodiimide or a triazine,
   such that reaction of the initial polymer, second compound, and coupling agent attach molecules of the second compound to the polymer chain through amide groups formed from the functional groups, thereby forming an aqueous solution of a modified polymer and, without separation of the modified polymer from the aqueous solution, the modified polymer participates in cross-linking through the amide groups and second compound thereby enhancing viscosity of the solution.

2. The method of claim 1, wherein reaction of the coupling agent, the initial polymer, and the second compound includes:
   reacting the coupling agent with carboxylic acid groups to form a reactive intermediate; and
   reacting amino groups with the intermediate to form amide groups.

3. The method of claim 1 wherein the coupling agent is a compound which incorporates a —N—C—N—moiety in which the nitrogen-carbon bonds are unsaturated.

4. The method of claim 1, wherein the second compound also includes a boronic acid group or a thiol group.

5. The method of claim 1, wherein residues of the second compound in the modified polymer attach to each other and thereby cross-link the polymer.

6. The method of claim 5, wherein the second compound includes a thiol group and residues of the second compound in the modified polymer cross-link the polymer by combination of thiol groups to form disulphide groups.

7. The method of claim 1, further comprising:
   including a further material in the aqueous solution and attaching residues of the second compound in the modified polymer to the further material so that the modified polymer cross-links the further material.

8. The method of claim 7, wherein the second compound includes a hydrophobic group, the further material is a viscoelastic surfactant including a hydrophobic group, and residues of the second compound attach to the viscoelastic surfactant by association of their hydrophobic groups without formation of covalent bonds.

9. The method of claim 7, wherein the further material is another polymer and residues of the second compound in the modified polymer attach to the further polymer and cross-link the two polymers.

10. The method of claim 7, wherein the second compound includes a boronic acid group, the further material is another polymer and contains diol groups, and boronic acid groups of the second compound in the modified polymer attach to the diol groups of the further polymer and cross-link the two polymers.

11. The method of claim 1, wherein contacting the initial polymer, second compound, and coupling agent is carried out in aqueous solution with a pH of 5.0 to 8.0.

12. The method of claim 1, further comprising:
delivering the aqueous solution of enhanced viscosity down a well to a subterranean location.

13. The method of claim 12, wherein:
a supply of aqueous liquid is connected to a flowpath which includes a surface flowpath from the supply to the well and an underground flowpath within the well; and at least one of:
contacting the initial polymer, second compound, and coupling agent includes mixing the initial polymer, second compound, and coupling agent with the aqueous liquid while the aqueous liquid is flowing along the flow path, and the reaction of the polymer, second compound, and coupling agent takes place while the aqueous liquid is flowing along the flowpath;
contacting the initial polymer, second compound, and coupling agent includes mixing a thickening polymer with aqueous liquid in the surface flowpath to form a solution of the thickening polymer, and causing or allowing the modified polymer to attach to further molecules in aqueous solution includes contacting the thickening polymer with the modified polymer while the thickening polymer solution is flowing along the flowpath; or
at least another one of the polymer, second compound, or coupling agent is supplied to the well separately from the aqueous liquid, and reaction of the polymer, second compound, and coupling agent takes place while the aqueous liquid is flowing within the well.

14. The method of claim 1, wherein the coupling agent is a triazine.

15. The method of claim 1, wherein the second compound is a compound having a molecular weight of no more than 1000 Daltons, or the second compound is a polymer with a mean molecular weight of 5000 Daltons.

16. A method of making a viscosified aqueous solution, the method comprising:
contacting in aqueous solution:
an initial polymer which includes a polymer chain with functional groups distributed along the polymer chain, the functional groups being either carboxylic acid or amino groups;
a second compound including at least one functional group which is either an amino group or carboxylic acid group the second compound functional group being the other type of functional group compared to the initial polymer functional group; and
a coupling agent, wherein the coupling agent is a carbodiimide or a triazine,
such that reaction of the initial polymer, second compound, and coupling agent attach molecules of the second compound to the polymer chain through amide groups formed from the functional groups, thereby forming an aqueous solution of a modified polymer and, without separation of the modified polymer from the aqueous solution, the modified polymer participates in cross-linking through the amide groups and second compound thereby enhancing viscosity of the solution;
wherein residues of the second compound in the modified polymer attach to each other and thereby cross-link the polymer; and
wherein the second compound includes a hydrophobic group and residues of the second compound in the modified polymer cross-link the polymer by association of hydrophobic groups without formation of covalent bonds.

17. A method of providing a viscosified aqueous fluid at a subterranean location accessed by a borehole, the method comprising:
pumping down the borehole in aqueous solution, without separating products of reaction from the solution, a reactive combination of:
an initial polymer that includes a polymer chain with functional groups distributed along the polymer chain, the functional groups being either carboxylic acid or amino groups;
a second compound that includes at least one functional group which is either an amino group or carboxylic acid group, the second compound functional group being the other type of functional group compared to the initial polymer functional group, wherein the second compound also includes at least one hydrophobic group; and
a coupling agent, wherein the coupling agent is a carbodiimide or a triazine,
thereby reacting the initial polymer, second compound, and coupling agent such that residues of the second compound attach to the initial polymer through amide groups formed from the functional groups, thereby forming an aqueous solution of a modified polymer, with the modified polymer participating in cross-linking through the amide groups and second compound, and thereby enhancing viscosity of the solution.

18. The method of claim 17, wherein reacting the coupling agent, the initial polymer, and the second compound includes:
reacting the coupling agent with carboxylic acid groups and forming a reactive intermediate; and
reacting amino groups with the intermediate to form amide groups,
wherein the modified polymer participates in cross-linking through association of hydrophobic groups within the aqueous solution.

* * * * *